United States Patent
Zhang et al.

(10) Patent No.: US 11,026,233 B2
(45) Date of Patent: Jun. 1, 2021

(54) EMISSION AND PANEL AWARE BEAM SELECTION

(71) Applicant: Apple Inc., Cupertino, CA (US)

(72) Inventors: Yushu Zhang, Beijing (CN); Zhibin Yu, Unterhaching (DE); Alexei Vladimirovich Davydov, Nizhny Novgorod (RU); Gang Xiong, Beaverton, OR (US); Guotong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 166 days.

(21) Appl. No.: 16/447,584

(22) Filed: Jun. 20, 2019

(65) Prior Publication Data

US 2019/0306850 A1  Oct. 3, 2019

Related U.S. Application Data

(63) Continuation of application No. PCT/CN2018/092040, filed on Jun. 20, 2018, and a continuation of application No. PCT/CN2018/096427, filed on Jul. 20, 2018, and a continuation of application No. PCT/CN2019/074737, filed on Feb. 8, 2019.

(60) Provisional application No. 62/688,624, filed on Jun. 22, 2018, provisional application No. 62/697,320, filed on Jul. 12, 2018, provisional application No. 62/805,873, filed on Feb. 14, 2019.

(51) Int. Cl.
*H04W 72/04* (2009.01)
*H04W 84/04* (2009.01)

(52) U.S. Cl.
CPC ....... *H04W 72/046* (2013.01); *H04W 72/042* (2013.01); *H04W 84/042* (2013.01)

(58) Field of Classification Search
None
See application file for complete search history.

(56) References Cited

U.S. PATENT DOCUMENTS

2018/0367205 A1* 12/2018 Liu ................. H04L 5/0048
2019/0109625 A1*  4/2019 Subramanian ......... H04B 7/088
2019/0342768 A1* 11/2019 Xu ................. H04B 7/0639

(Continued)

*Primary Examiner* — Diane L Lo
(74) *Attorney, Agent, or Firm* — Kowert Hood Munyon Rankin and Goetzel PC

(57) ABSTRACT

A user equipment (UE) can include processing circuitry coupled to memory. To configure the UE for New Radio (NR) communications, the processing circuitry is to decode a plurality of CSI-RSs received from a base station on a corresponding plurality of beams. DCI received via a PDCCH is decoded, the DCI activating reporting of beam emissions information associated with the plurality of beams. A CSI report is encoded with the beam emissions information for transmission to the base station, the beam emissions information comprising a flag for each beam of the plurality of beams indicating whether the beam can be used for uplink beam indication. Configuration signaling is decoded with the uplink beam indication, the uplink beam indication based on the beam emissions information and including a CRI of a selected beam of the plurality of beams. Data is encoded for transmission via an uplink channel using the selected beam.

20 Claims, 32 Drawing Sheets

(56) References Cited

U.S. PATENT DOCUMENTS

2020/0145079 A1\* 5/2020 Marinier .............. H04B 7/0456
2020/0178279 A1\* 6/2020 Frenne .............. H04W 72/1289

\* cited by examiner

EMISSION AND PANEL AWARE BEAM SELECTION

PRIORITY CLAIM

This application claims the benefit of priority to the following applications:

PCT Patent Application Serial No. PCT/CN2019/074737, filed Feb. 8, 2019, and entitled "SYSTEM AND METHOD FOR RETRANSMISSION OF CFRA-BFR AND CROSS-CC BEAM FAILURE DETECTION;"

PCT Patent Application Serial No. PCT/CN2018/096427, filed Jul. 20, 2018, and entitled "SINGLE BEAM OPERATION AND DOWNLINK BEAM MANAGEMENT WITH LOW OVERHEAD AND LATENCY;"

U.S. Provisional Patent Application Ser. No. 62/805,873, filed Feb. 14, 2019, and entitled "SYSTEM AND METHOD FOR EMISSION AND PANEL AWARE BEAM SELECTION;"

PCT Patent Application Serial No. PCT/CN2018/092040, filed Jun. 20, 2018, and entitled "RETRANSMISSION OF CONTENTION FREE RANDOM ACCESS (CFRA) BEAM FAILURE RECOVERY (BFR) AND CROSS-COMPONTNENT CARRIER (CC) BEAM FAILURE DETECTION (BFD);"

U.S. Provisional Patent Application Ser. No. 62/688,624, filed Jun. 22, 2018, and entitled "METHODS OF SOUNDING REFERENCE SIGNAL (SRS) BASED BEAM FAILURE RECOVERY INDICATION;" and U.S. Provisional Patent Application Ser. No. 62/697,320, filed Jul. 12, 2018, and entitled "SYSTEM AND METHOD FOR EMISSION AND PANEL AWARE BEAM SELECTION."

Each of the above-identified patent applications are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for retransmission of contention-free random access (CFRA) beam failure recovery (BFR) (CFRA-BFR) cross-component carrier (CC) beam failure detection (BFD). Additional aspects are directed to single beam operation and downlink beam management with low overhead and latency. Yet other aspects are directed to systems and methods for emission and panel aware beam selection. Other aspects are directed to retransmission of CFRA BFR and cross-CC BFD. Additional aspects are directed to systems and methods for sounding reference signal (SRS) based beam failure recovery indication. Yet other aspects are directed to systems and methods for emission and panel aware beam selection.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming, and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Additional operations in the unlicensed spectrum include NR-U type communications in the unlicensed band.

Further enhanced operation of LTE systems in the licensed as well as unlicensed spectrum is expected in future releases and 5G systems. Such enhanced operations can include techniques to address retransmission of CFRA BFR and cross-CC BFD, single beam operation and downlink beam management with low overhead and latency, emission and panel aware beam selection, and SRS based beam failure recovery indication.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
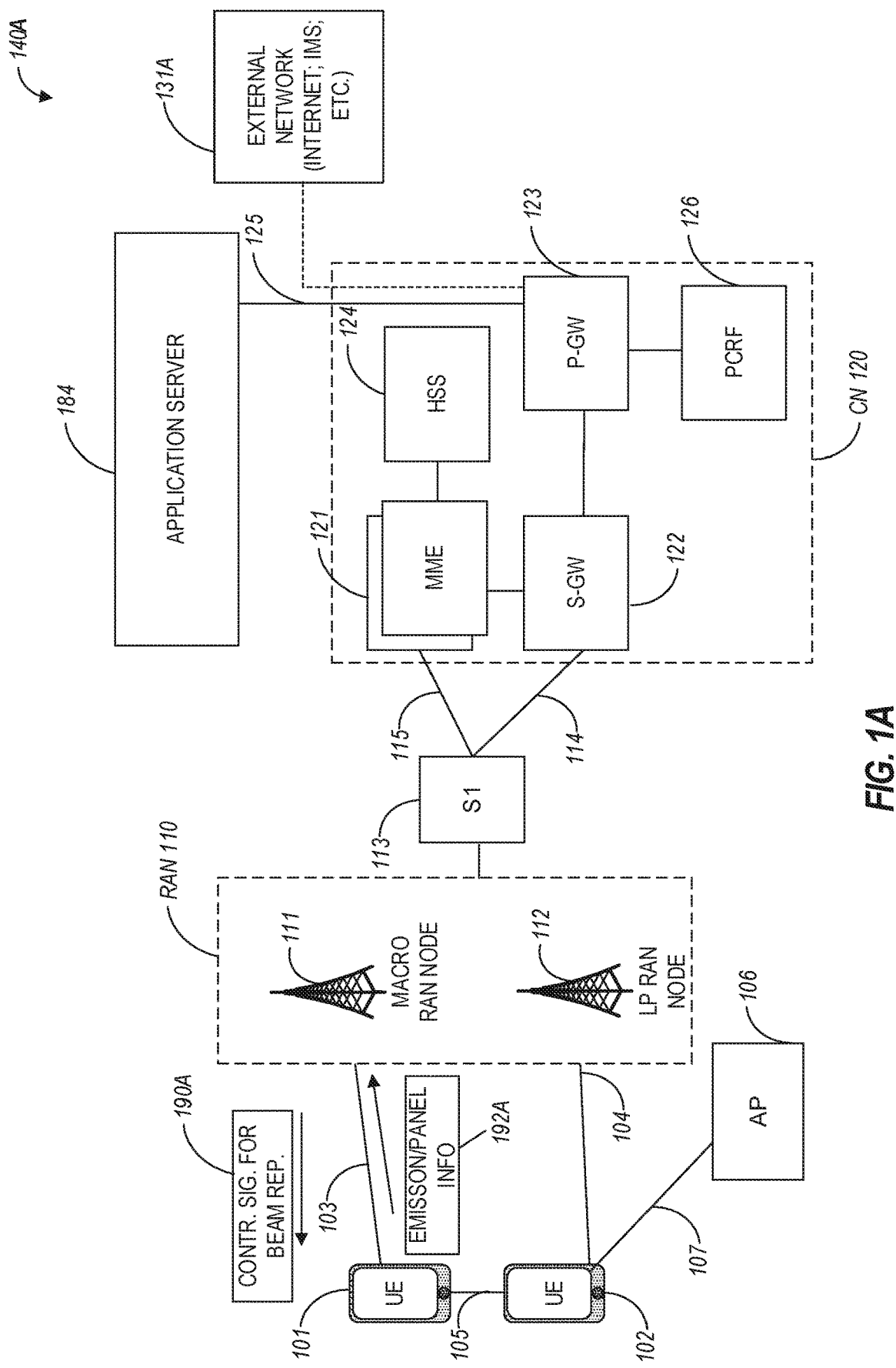
FIG. 1A illustrates an architecture of a network in accordance with some aspects.

FIG. 1A illustrates an architecture of a network in accordance with some aspects. The network 140A is shown to include user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

Any of the radio links described herein (e.g., as used in the network 140A or any other illustrated network) may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data. Rates for GSM Evolution (EDGE) radio communication technology, and/or a Third Generation Partnership Project (3GPP) radio communication technology, for example Universal Mobile Telecommunications System (UITS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMITS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Rel ease 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hiicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where, in particular, the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The LE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NIPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (P-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can receive configuration information 190A for beam reporting via, e.g., higher layer signaling or other types of signaling. The configuration information 190A can include downlink control information (DCI). The DCI can activate reporting of beam emissions or panel information (also referred to as emission/panel information) 192A to the gNB 111 as discussed herein. After receiving such information, the gNB 111 can communicate beam indication to the UE 101, based on the received emission/panel information 192A. The beam indication can indicate an uplink or downlink beam for transmitting or receiving by the UE of uplink or downlink data.

Figure 1B:
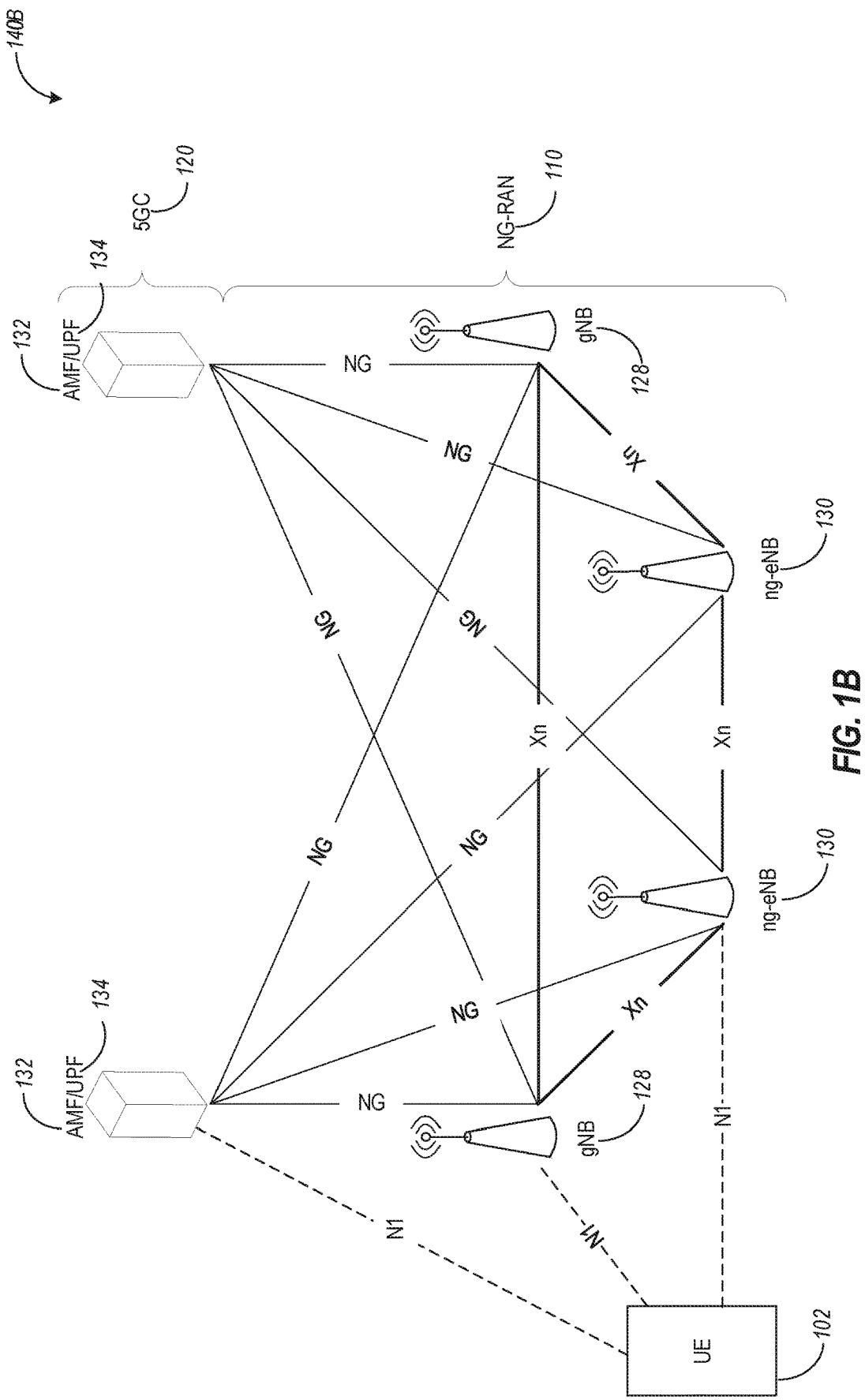
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NC-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
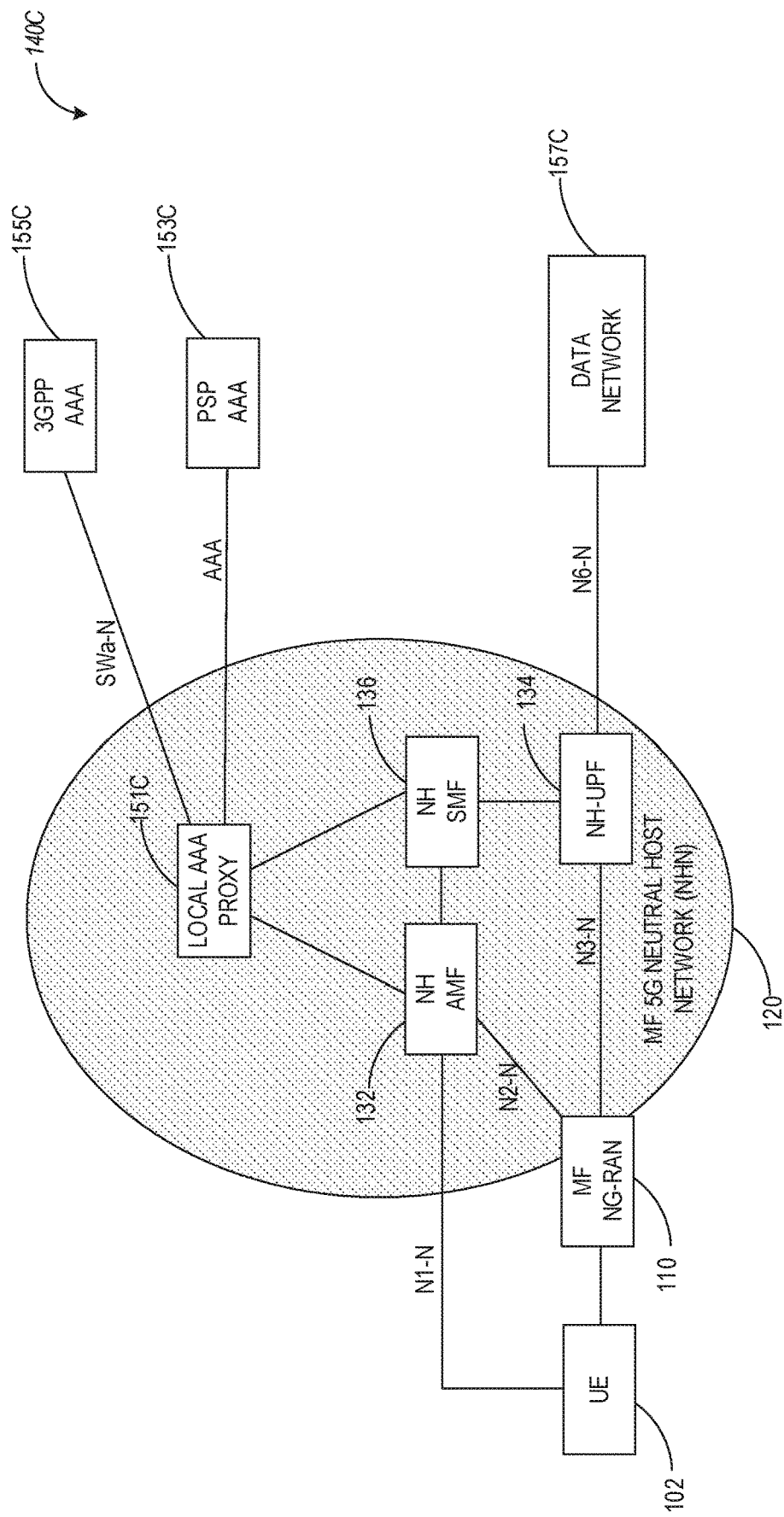
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and the core network 120. The NG-RAN 110 can be a MulteFire NG-RAN (MF NG-RAN), and the core network 120 can be a MulteFire 5G neutral host network (NHN).

In some aspects, the MF NIN 120 can include a neutral host AMF (NH AMF) 132, an NH SMF 136, an NH UPF 134, and a local AAA proxy 151C. The AAA proxy 151C can provide a connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as an AMF in a 3GPP 5G core network (e.g., as described in reference to FIG. 1D). The NH-SMF 136 can be configured to provide similar functionality as an SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
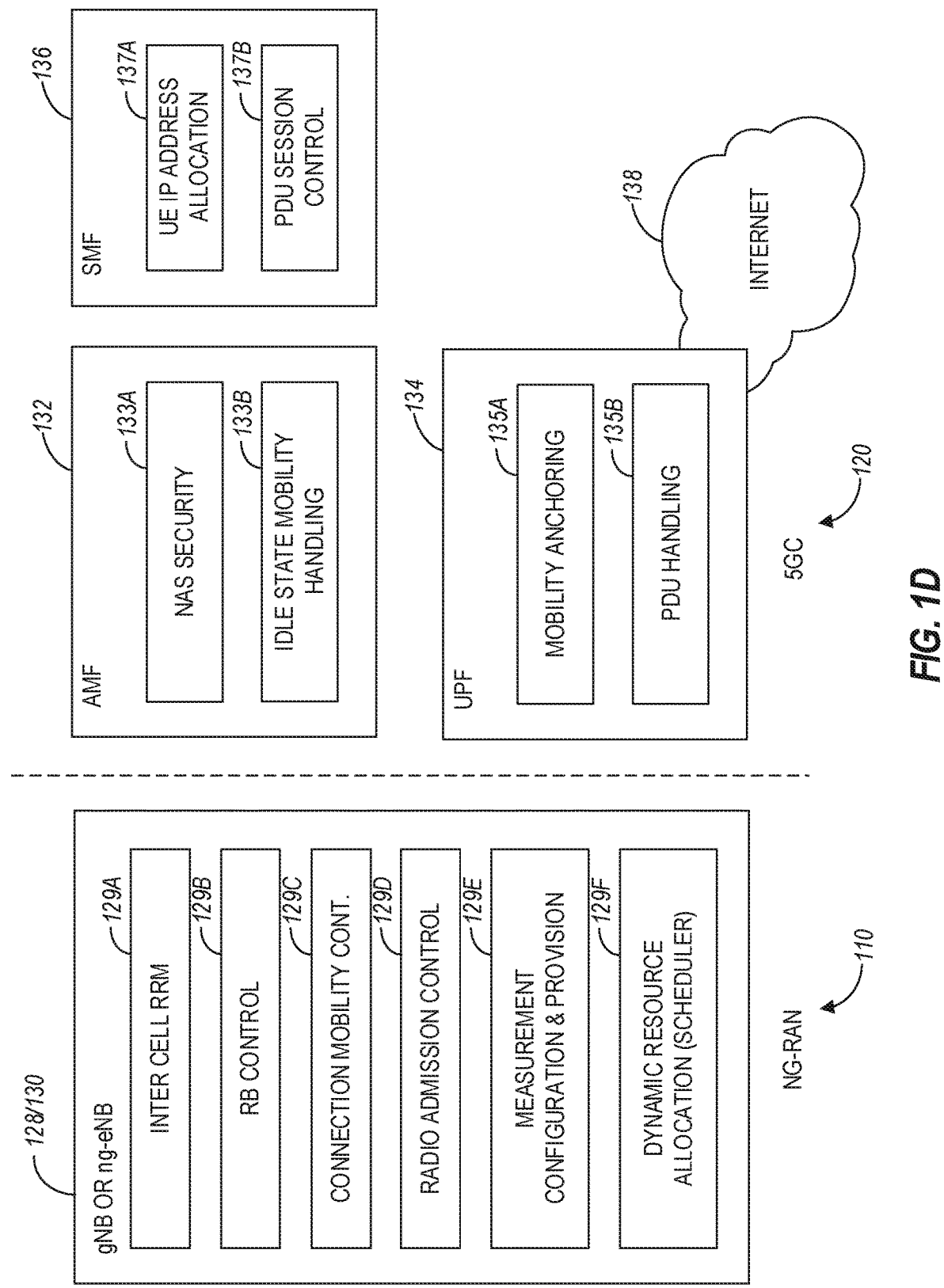
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
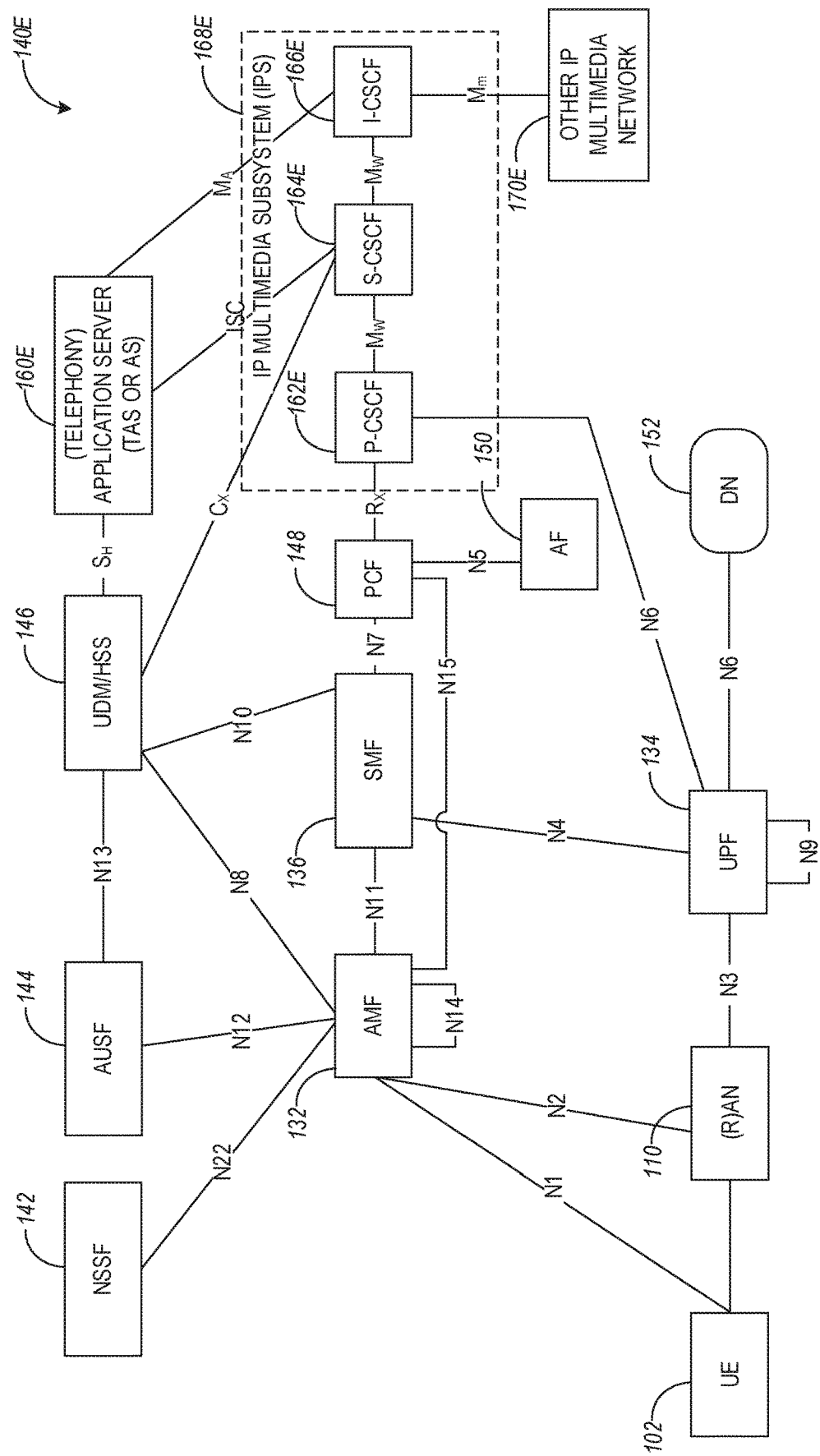
FIG. 1E and FIG. 1F illustrate a non-roaming 5G system architecture in accordance with some aspects.
Figure 1F:
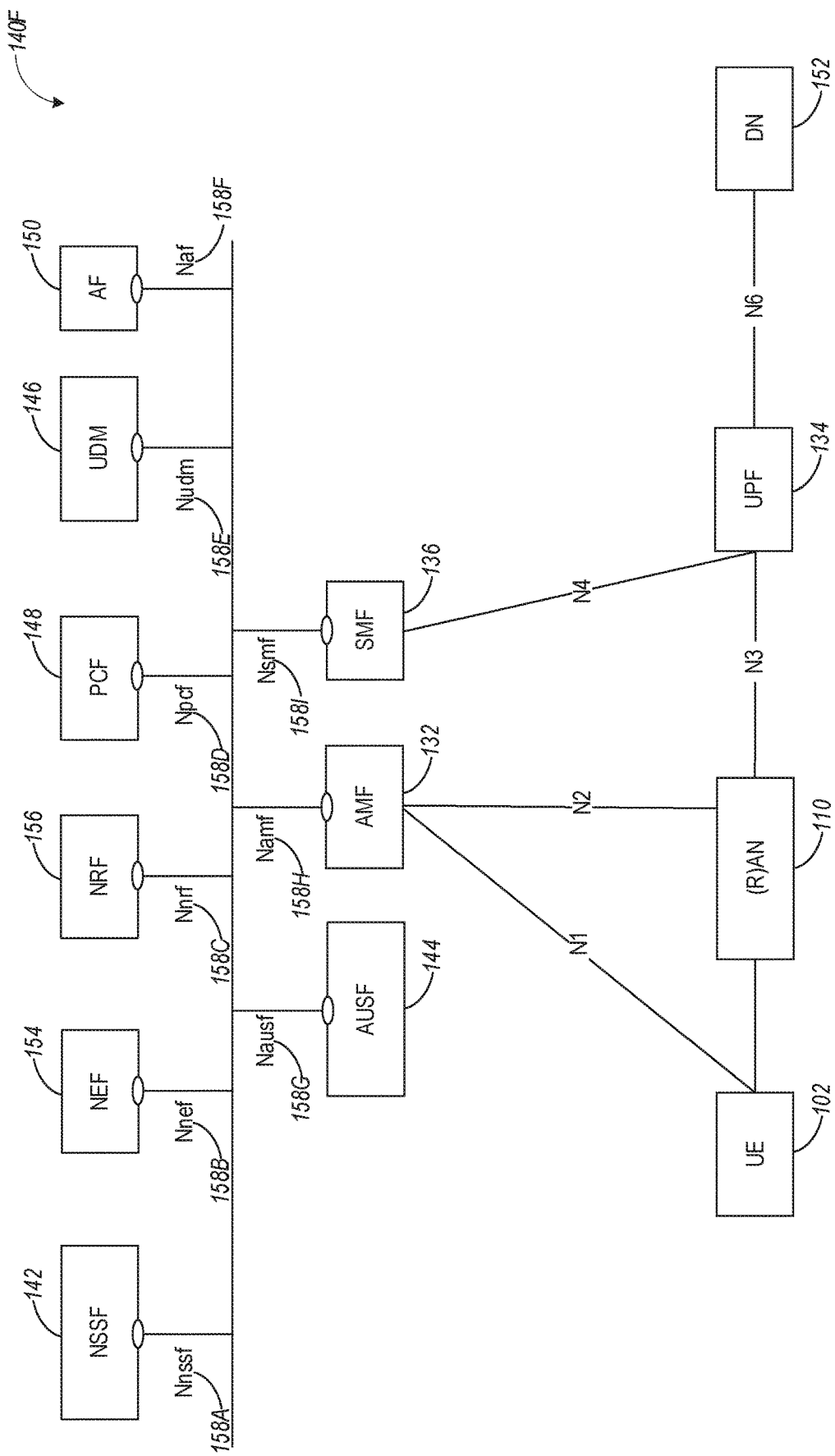

FIG. 1E and FIG. 1F illustrate a non-roaming 5G system architecture in accordance with some aspects. Referring to FIG. 1E, there is illustrated a 5G system architecture 140E in a reference point representation. More specifically, LIE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to network policy. The UPF can be deployed in one or more configurations according to the desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use unified access barring mechanism using one or more of the techniques described herein, which access barring mechanism can be applicable for all RRC states of the UE 102, such as RRC_IDLE, RRC_CONNECTED, and RRC_I-NACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
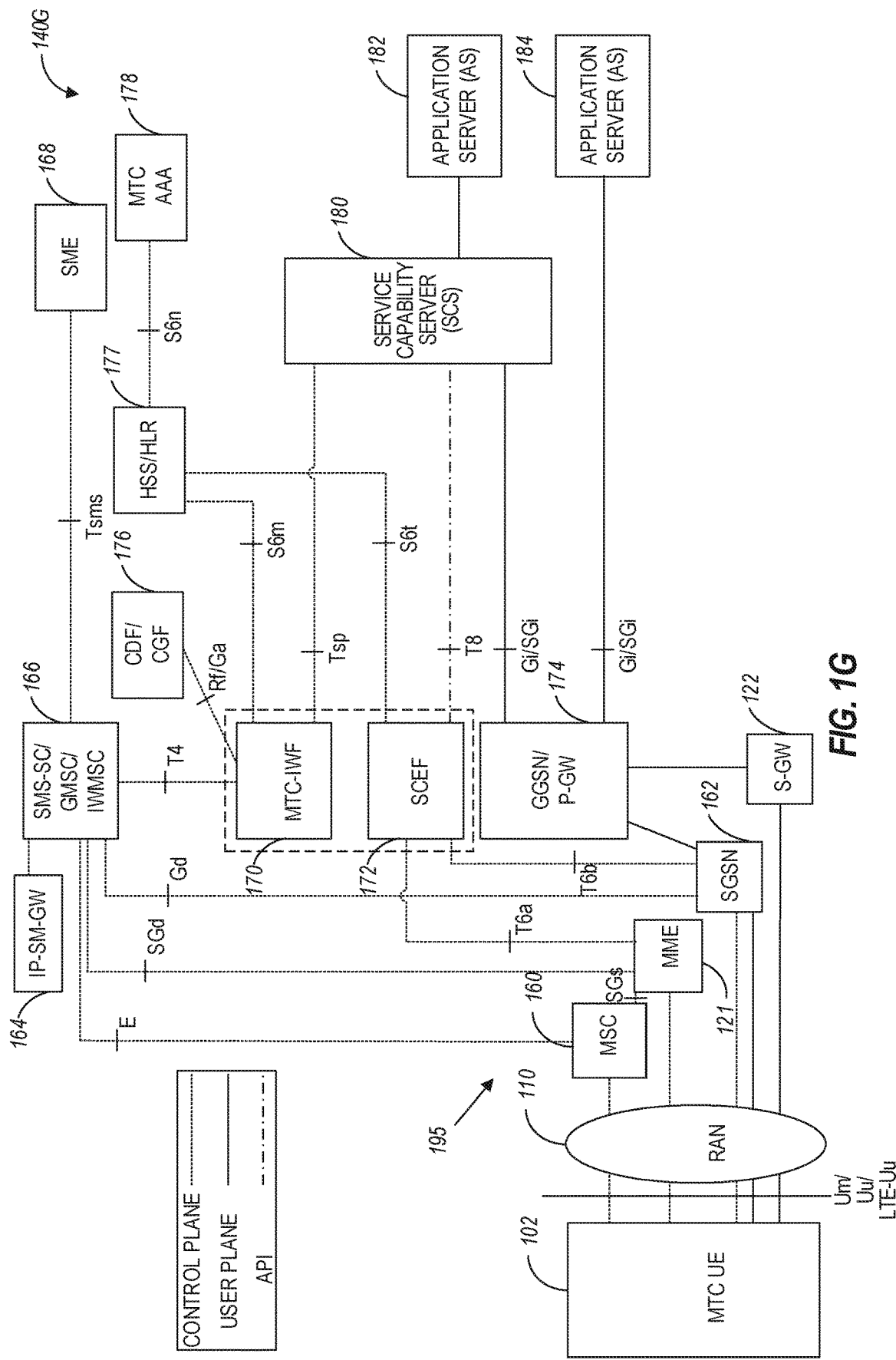
FIG. 1G illustrates an example Cellular Internet-of-Things (CIoT) network architecture in accordance with some aspects.

FIG. 1G illustrates an example of CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, MME 121, a serving GPRS support node (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/Packet-GW (P-GW) 174, a charging data function (CDF)/charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), S6n (a reference point used by MTC-AAA server 178 to interrogate HSS/HLR 177), and S6t (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MME) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the CIoT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6a/T6b reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smartphone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, the circuitry may include logic, at least partially operable in hardware. In some aspects, circuitry, as well as modules disclosed herein, may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
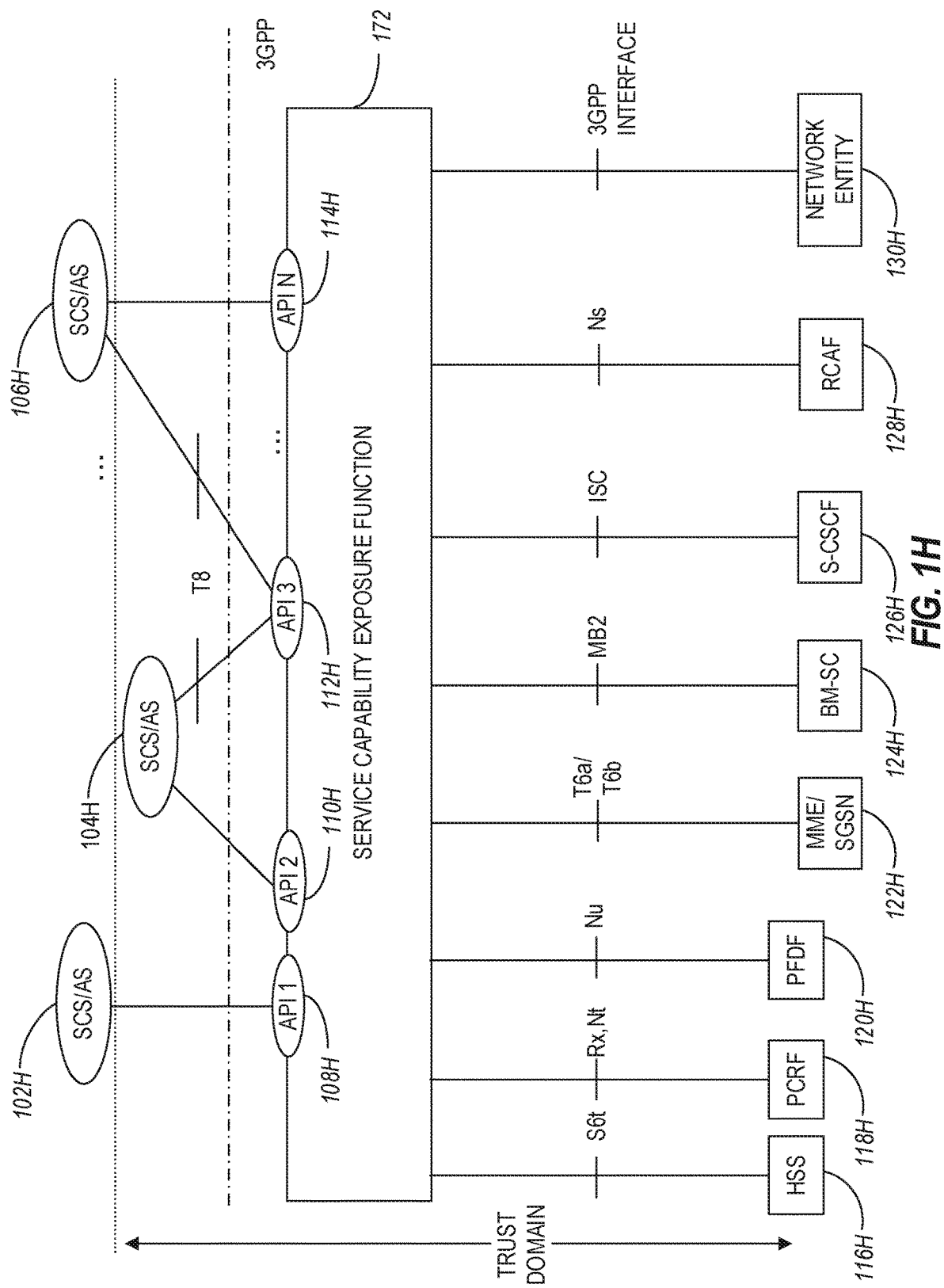
FIG. 1H illustrates an example Service Capability Exposure Function (SCEF) in accordance with some aspects.

FIG. 1H illustrates an example of a Service Capability Exposure Function (SCEF) in accordance with some aspects. Referring to FIG. 1H, the SCEF 172 can be configured to expose services and capabilities provided by 3GPP network interfaces to external third-party service provider servers hosting various applications. In some aspects, a 3GPP network such as the CIoT architecture 140G, can expose the following services and capabilities: a home subscriber server (HSS) 1161H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SCS)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
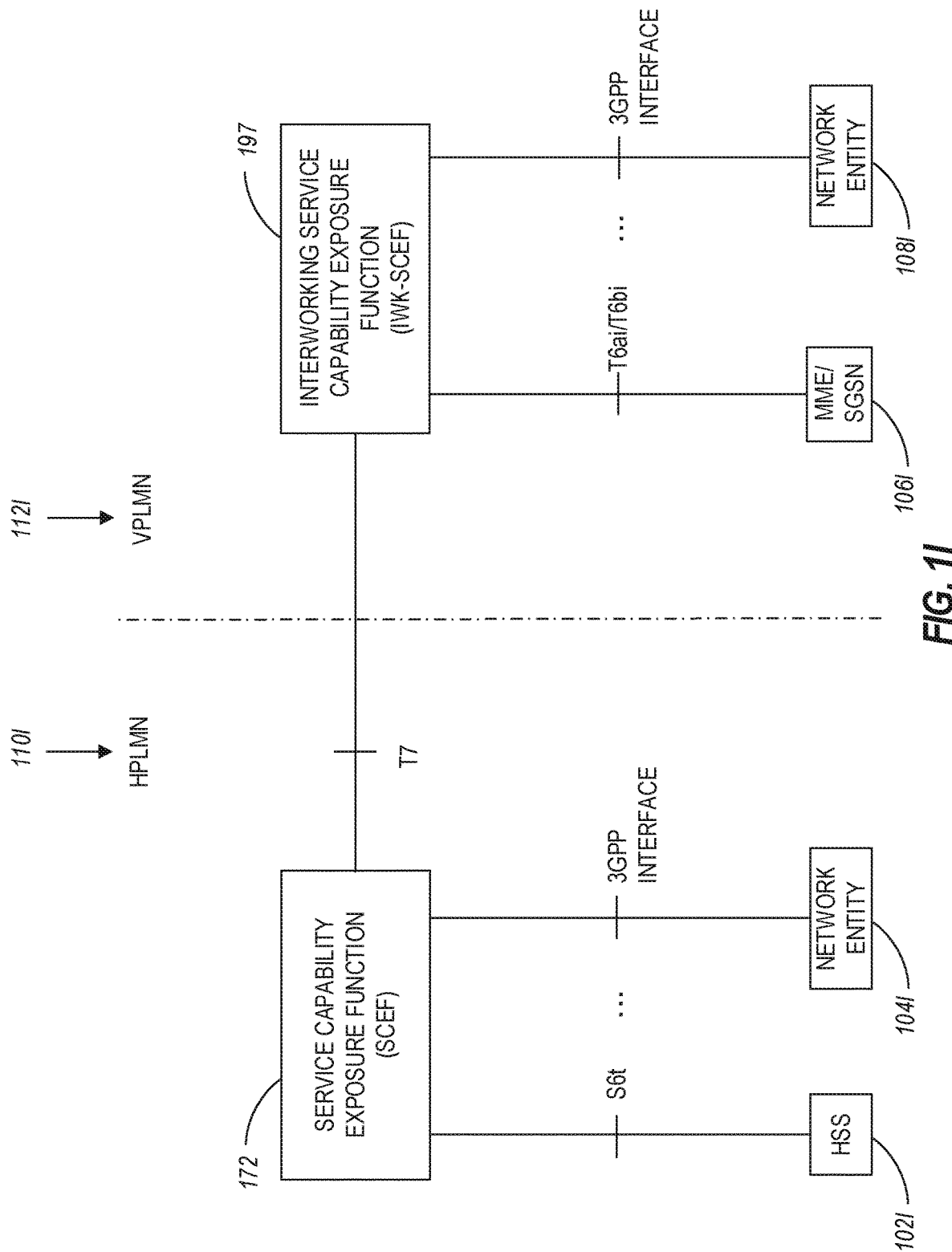
FIG. 1I illustrates an example roaming architecture for SCEF in accordance with some aspects.

FIG. 1I illustrates an example of roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112I. In this case, the 3GPP network services and capabilities within the VPLMN 112I can be exposed to the SCEF 172 via an interworking SCEF (IWK-SCEF) 197 within the VPLMN 112I.

Figure 1J:
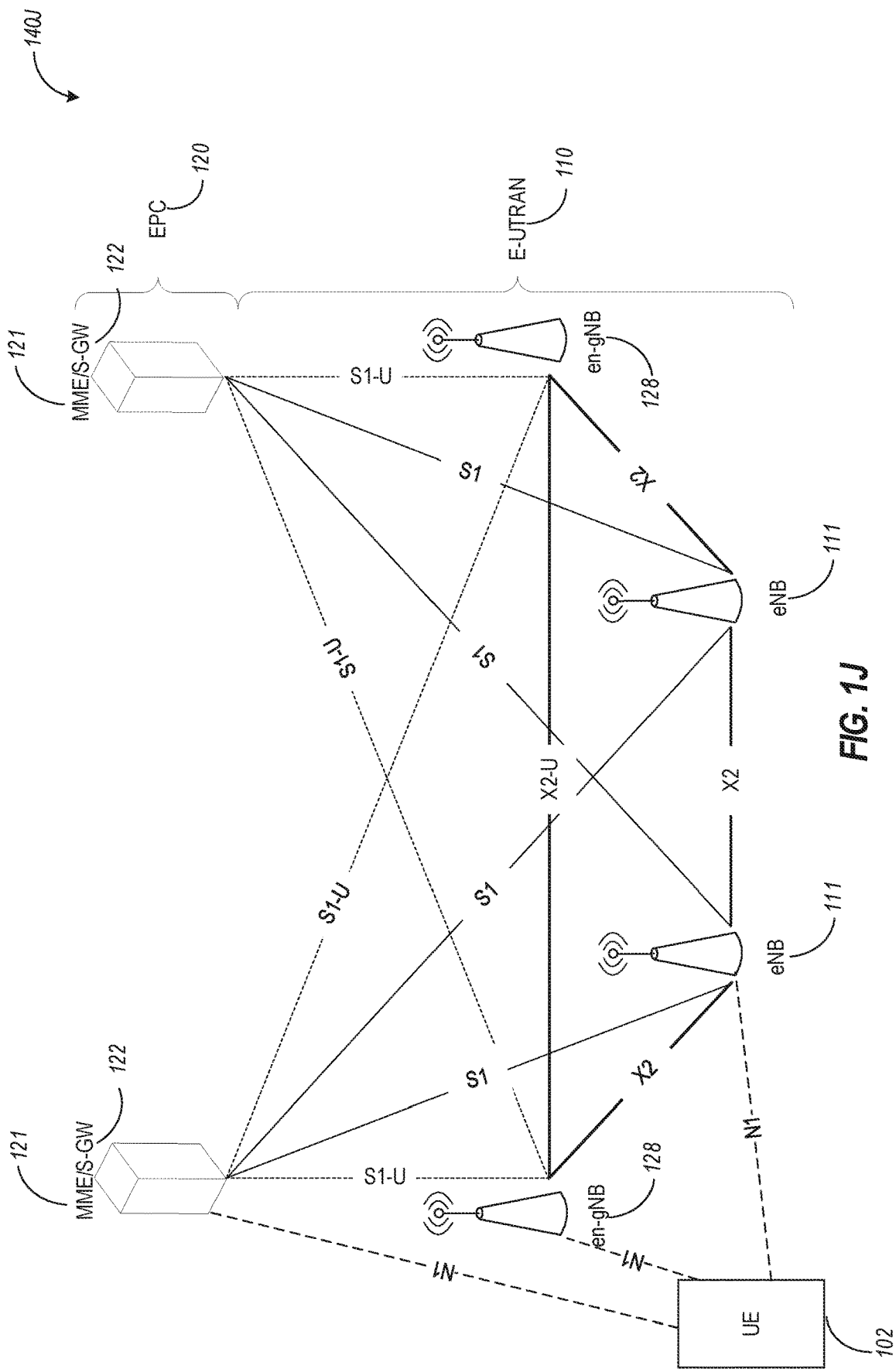
FIG. 1J illustrates an example Evolved Universal Terrestrial Radio Access (E-UTRA) New Radio Dual Connectivity (EN-DC) architecture in accordance with some aspects.

FIG. 1J illustrates an example Evolved Universal Terrestrial Radio Access (E-UTRA) New Radio Dual Connectivity (EN-DC) architecture in accordance with some aspects. Referring to FIG. 1G, the EN-DC architecture 140J includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140J. The eNBs 111 can be configured as master nodes (or MeNBs) in the EN-DC communication architecture 140J. as illustrated in FIG. 1J, the eNBs 111 are connected to the EPC 120 via the S1 interface and to the EN-gNBs 128 via the X2 interface. The EN-gNBs 128 may be connected to the EPC 120 via the S1-U interface, and to other EN-gNBs via the X2-U interface.

Figure 2:
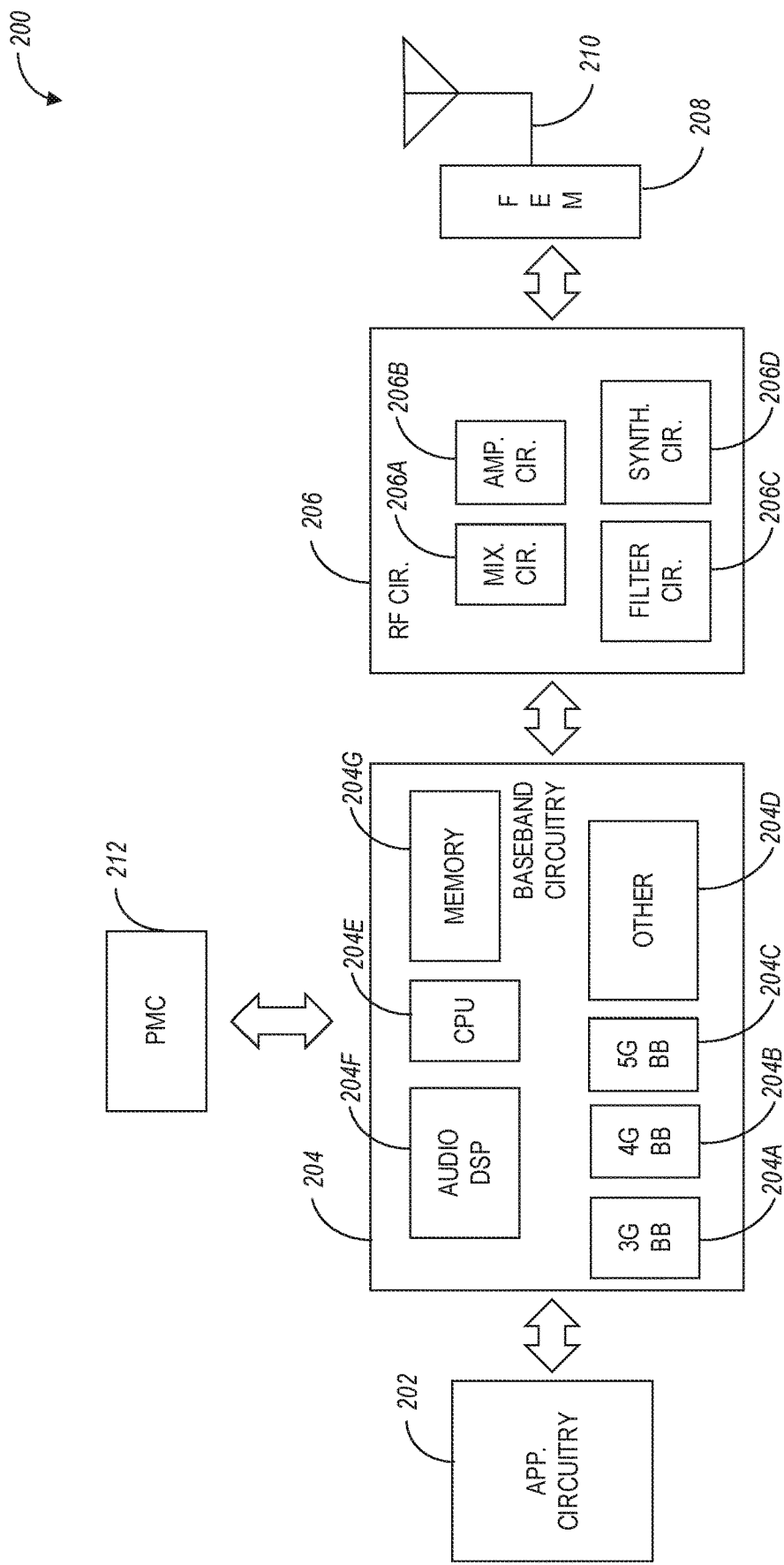
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third-generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth-generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may include elements for compression/decompression and echo cancellation and may include other suitable processing elements in other aspects. Components of the baseband circuitry 204 may be suitably combined in a single chip, a single chipset, or disposed on the same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and upconversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct upconversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include an analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the REF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. The divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump, and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a LE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of, various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
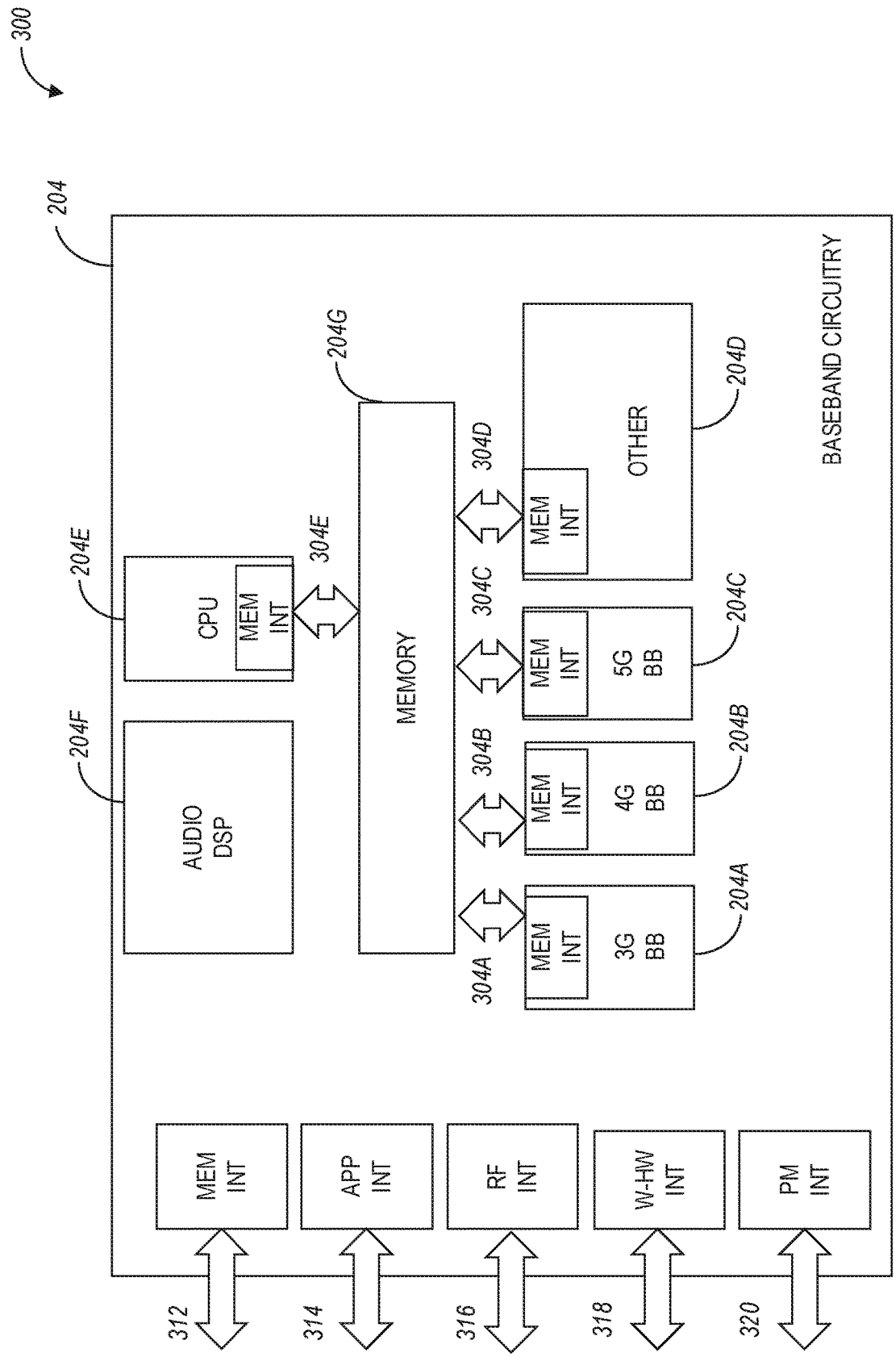
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
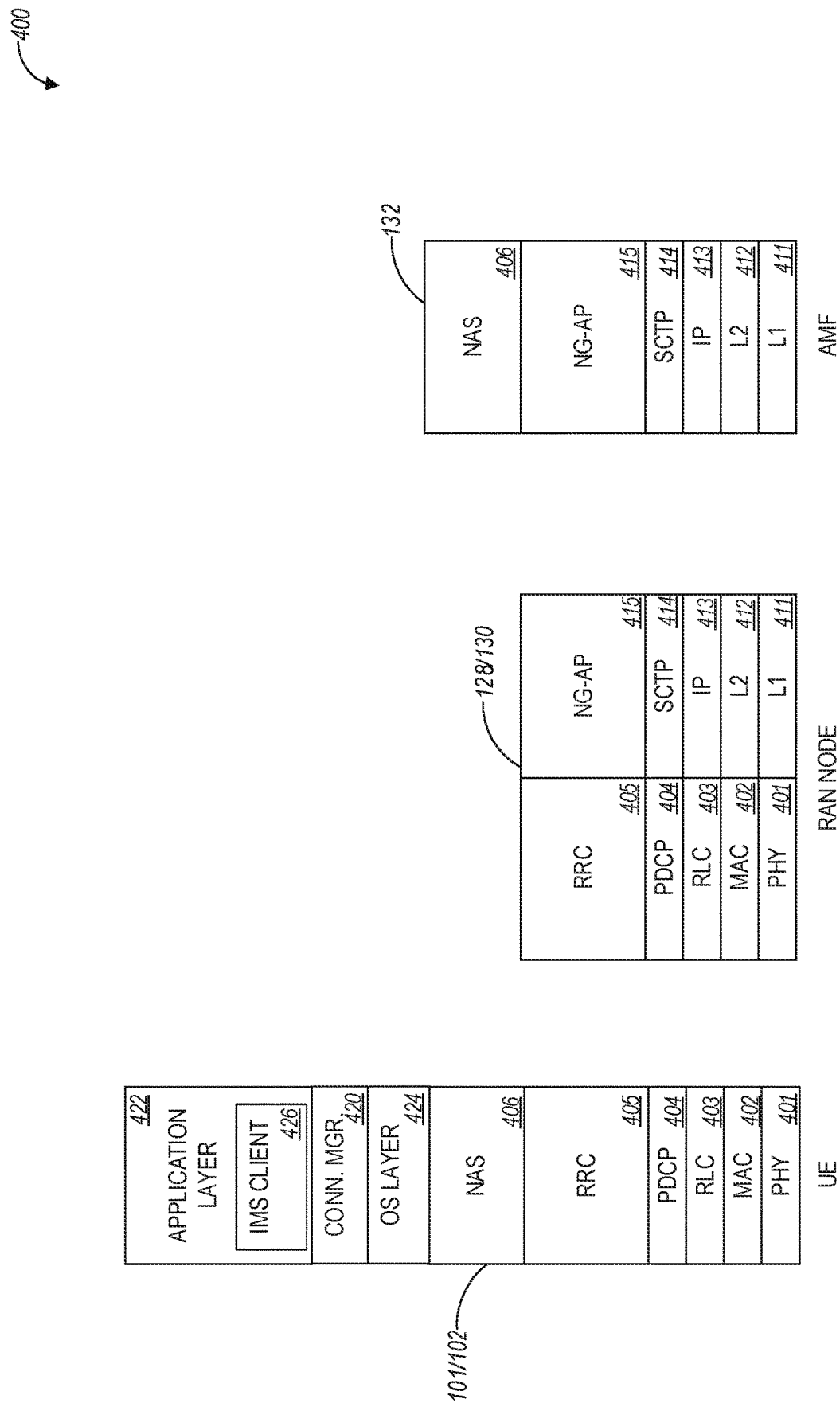
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may in some aspects operate in a plurality of modes of operation, including Transparent Mode (TM), Unacknowledged Mode (UM), and Acknowledged Mode (AM). The RLC layer 403 may execute the transfer of upper layer protocol data units (PDUs), error correction through automatic repeat request (ARQ) for AM data transfers, and segmentation and reassembly of RLC SDUs for EUM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split bearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging initiated by 5GC 120 or NG-RAN 110, establishment, maintenance, and release of an RRC connection between the LIE and NG-RAN (e.g., RRC connection paging, RRC connection establishment, RRC connection addition, RRC connection modification, and an RRC connection release, also for carrier aggregation and Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS layer 406 in the UE and the NAS layer 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
|---|---|---|---|
| Registration Request | Initial registration procedure | Attach Request | Attach procedure |
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PHY layer 401, the MAC layer 402, the RLC layer 403, the PDCP layer 404, and the RRC layer 405.

The non-access stratum (NAS) protocol layers 406 forms the highest stratum of the control plane between the UE 101 and the AMF 132 as illustrated in FIG. 4. In aspects, the NAS protocol layers 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and an application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non-UE-associated services. These services perform functions including, but not limited to CE context management, PDU session management and management of corresponding NG-RAN resources (e.g. Data Radio Bearers [DRBs]), UE capability indication, mobility, NAS signaling transport, and configuration transfer (e.g. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMF 132 to exchange information.

The RAN node 128/130 and the AMF 132 may utilize an N2 interface to exchange control plane data via a protocol stack comprising the L1 layer 411, the L2 layer 412, the IP layer 413, the SCTP layer 414, and the S1-AP layer 415.

Figure 5:
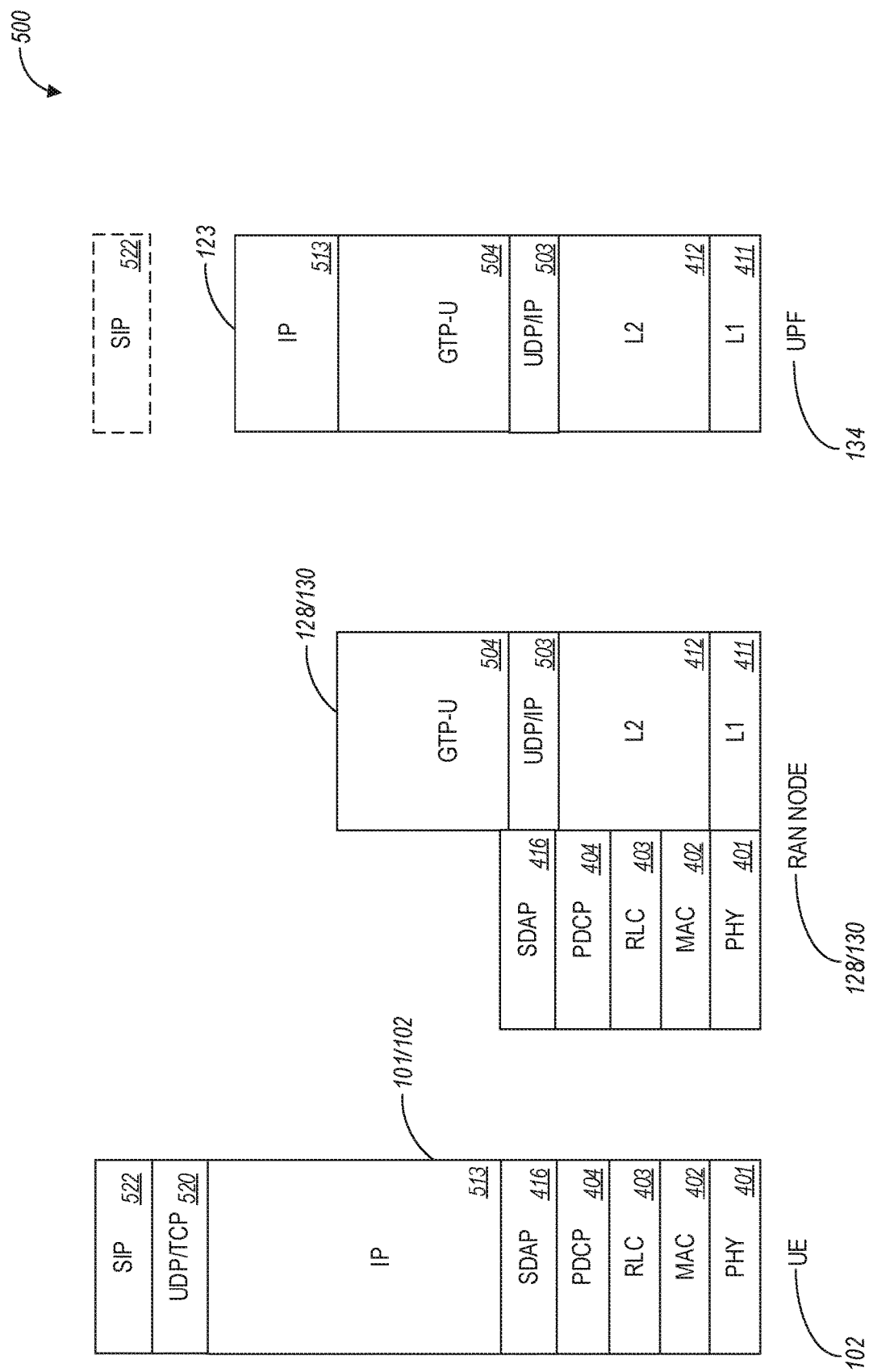
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB), and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520 and can be used by the UE 102 and the UPF 134.

The General Packet Radio Service (GPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
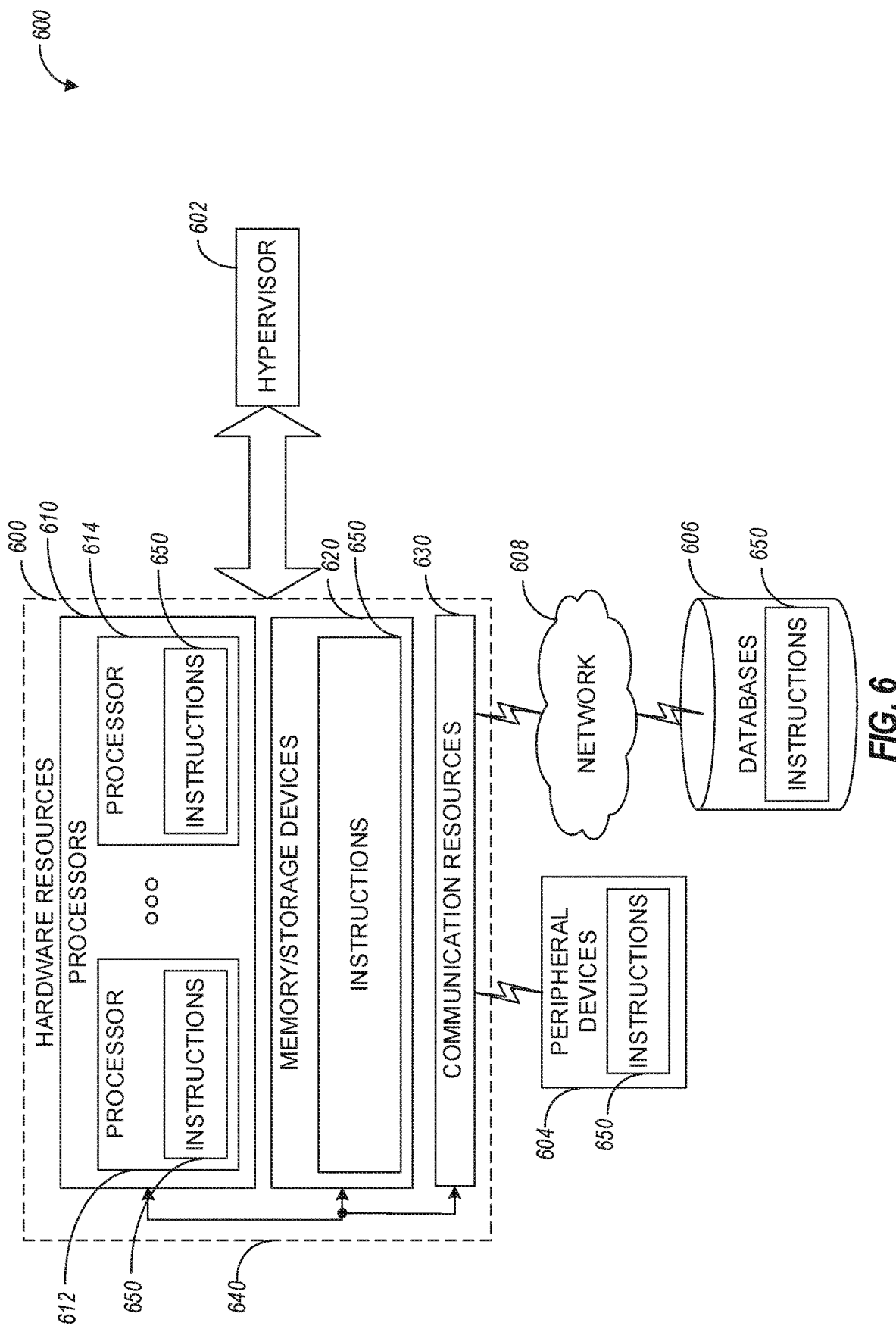
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g., NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include a main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
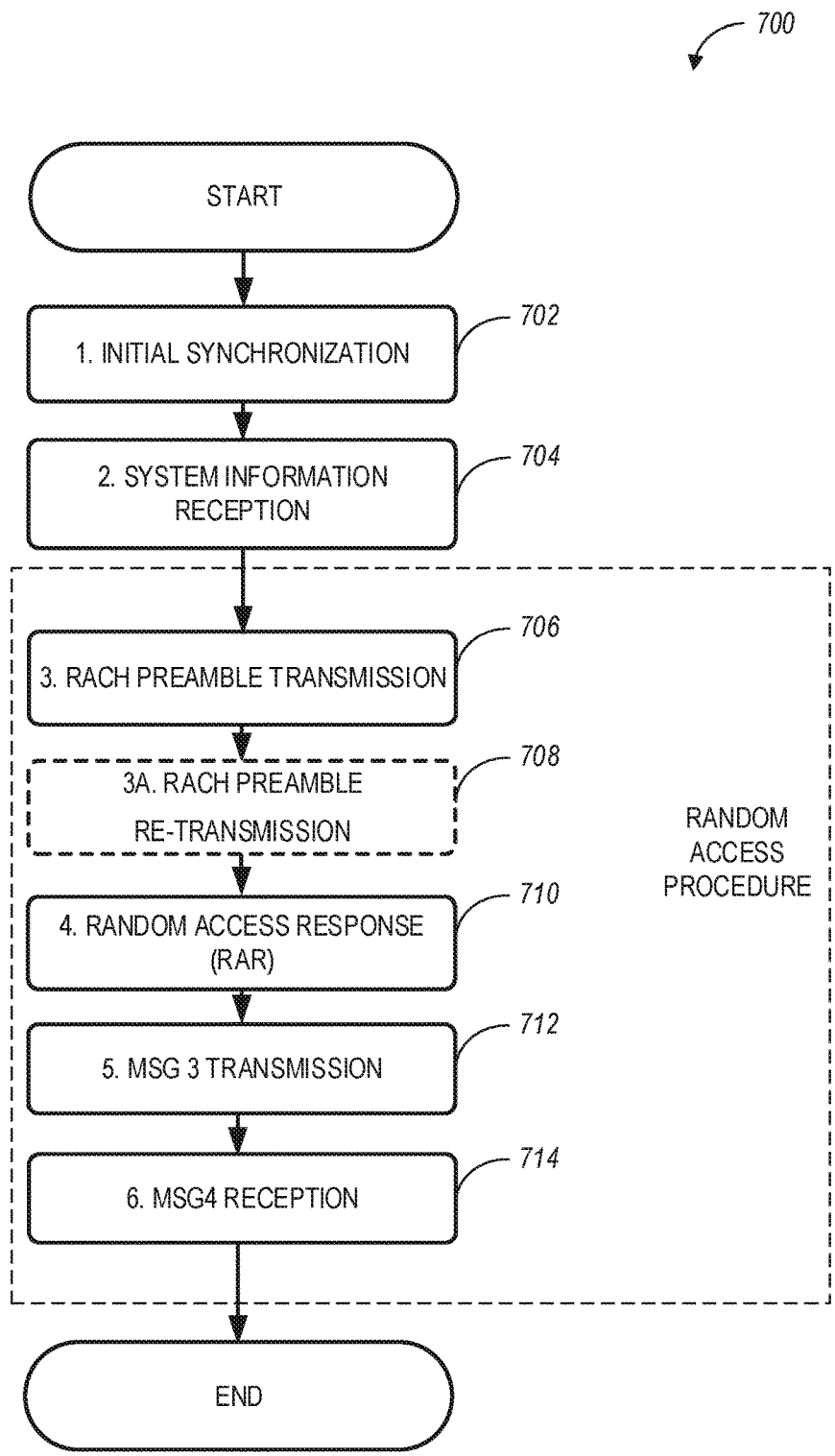
FIG. 7 is an illustration of an initial access procedure including PRACH preamble retransmission in accordance with some aspects.

FIG. 7 is an illustration of an initial access procedure 700 including PRACH preamble retransmission which can be performed by the UE 101, in accordance with some aspects. Referring to FIG. 7, the initial access procedure 700 can start with operation 702, when initial synchronization can take place. For example, the UE 101 can receive a primary synchronization signal and a secondary synchronization signal to achieve the initial synchronization. In some aspects, the initial synchronization at operation 702 can be performed using one or more SS blocks received within an SS burst set. At operation 704, the UE 101 can receive system information, such as one or more system information blocks (SIBs) and/or master information blocks (MIBs).

At operation 706 through 714, a random access procedure can take place. More specifically, at operation 706, a PRACH preamble transmission can take place as message 1 (Msg1). At operation 710, UE 101 can receive a random access response (RAR) message, which can be random access procedure message 2 (Msg2). In Msg2, the node (e.g., gNB) 111 can respond with random access radio network temporary identifier (RA-RNTI), which can be calculated from the preamble resource (e.g., time and frequency allocation).

In some aspects, UE 101 can be configured to perform one or more retransmissions of the PRACH preamble at operation 708, when the RAR is not received or detected within a preconfigured or predefined time window. The PRACH preamble retransmission can take place with power ramping, as explained hereinbelow so that the transmission power is increased until the random-access response is received.

At operation 712, UE 101 can transmit a random access procedure message 3 (Msg3), which can include a radio resource control (RRC) connection request message. At operation 714, a random access procedure message 4 (Msg4) can be received by the UE 101, which can include an RRC connection setup message, carrying the cell radio network temporary identifier (CRNTI) used for subsequent communication between the UE 101 and the node 111.

In some aspects associated with 5G communication systems, the UE and the gNB may maintain a plurality of beams. An optimal gNB-UE beam pair can help to increase link budget. However due to blockage or UE's movement or rotation, a current beam pair may not provide optimal communication performance. If the beams used for physical downlink control channel (PDCCH) fail below a threshold within a given time, which is based on beam failure detection (BFD) procedure, it can be considered as a beam failure. A UE can use a beam failure recovery (BFR) operation to inform the gNB of a new beam information. An example BFR procedure is shown in FIG. 8.

Figure 8:
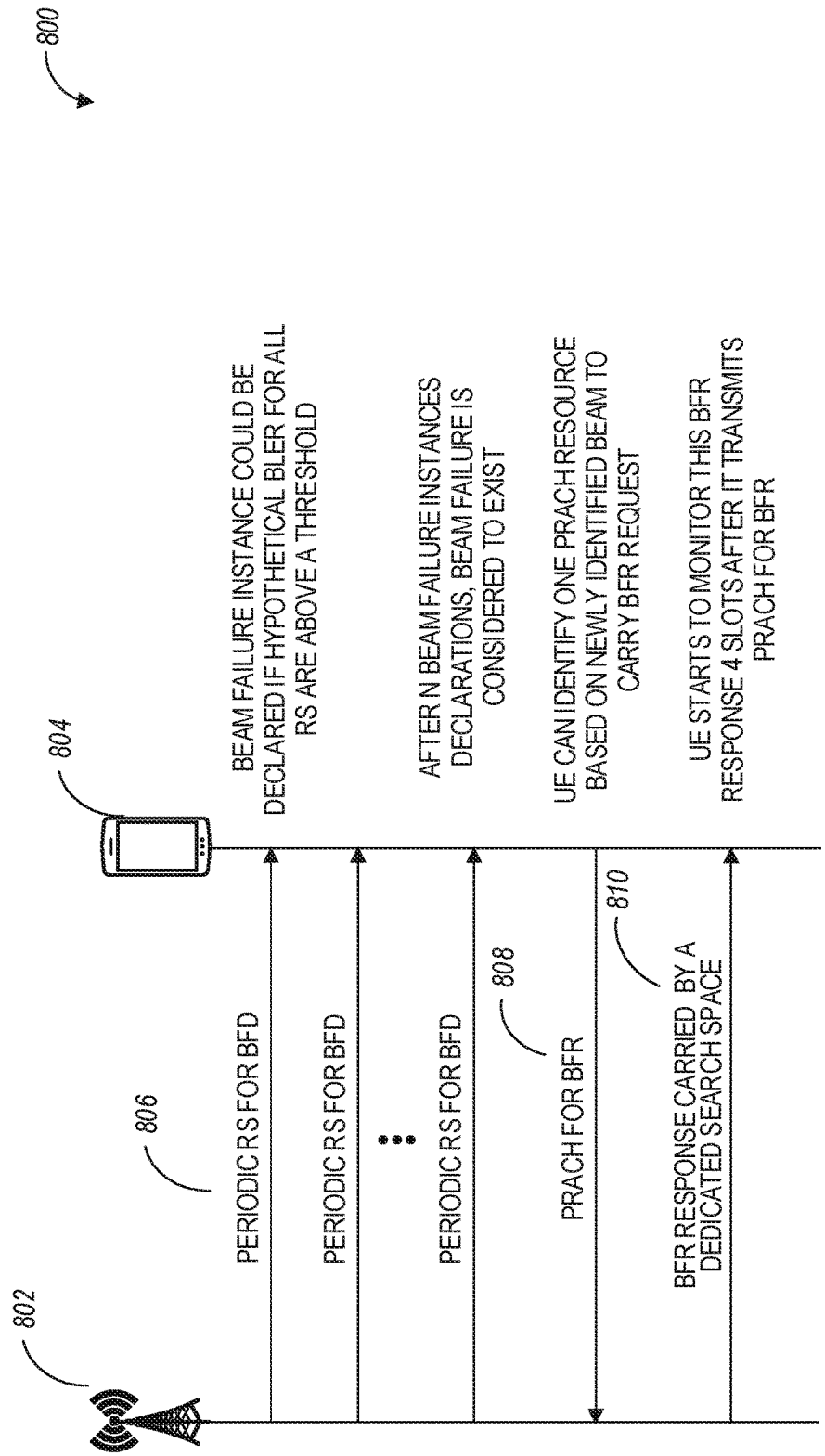
FIG. 8 illustrates an example procedure for beam failure recovery (BFR), in accordance with some aspects.

FIG. 8 illustrates an example procedure for beam failure recovery (BFR), in accordance with some aspects. Referring to FIG. 8, the procedure 800 takes place between a gNB 802 and a UE 804. At operation 806, periodic reference signals (RSs) are communicated from the gNB 802 to the UE 804. A beam failure instance could be declared if a hypothetical block error rate (BLER) for all RSs are above a threshold. After N number of beam failure instance declarations, a beam failure is considered to exist.

At operation 808, PRACH for BFR is communicated. The UE can identify one PRACH resource based on newly identified beam to carry a BFR request. At operation 810, a BFR response carried by a dedicated search space is communicated from the gNB 802 to the UE 804. In some aspects, the UE can start to monitor the BFR response 4 slots (or another number of slots) after the UE transmits PRACH for BFR.

In some aspects, the PRACH to carry BFR request can be associated with the newly identified beam. This new identified beam should be based on the Layer 1 Reference Signal Receiving Power (L1-RSRP) measured from configured DL RS resources. In some aspects, only the beams whose L1-RSRP is above a threshold can be considered as a candidate new beam. In some aspects, the search space used to carry BFR response is configured by higher layer signaling, which is called as SS-BFR in the following sections. In some aspects, the SS-BFR can be quasi-co-located (QCLed) with the newly identified beam.

In some aspects, PRACH for BFR is not detected by the gNB, and then the retransmission of PRACH for BFR could be allowed. However, whether the UE can change the newly identified beam during retransmission of the BFR can be one issue to be addressed by the disclosed techniques. Furthermore, how to assume the QCL information to monitor SS-BFR for the retransmission of PRACH for BFR can be another issue to be addressed by the disclosed techniques. In some aspects, the PRACH for BFR indicates contention-free PRACH.

In some aspects, for beam failure detection, if the downlink (DL) reference signal (RS) is not explicitly configured, the UE can use the reference signal configured in a Transmission Configuration Indication (TCI) state for Control Resource Set (CORESET) in active Bandwidth Part (BWP).

In some aspects, whether the BFD RS can be from another Component Carrier (CC) or BWP can be an issue addressed by the disclosed techniques.

Techniques disclosed herein can include some methods for BFR and BFD, including new beam identification for retransmission of PRACH based BF, QCL assumption for SS-BFR after retransmission of PRACH based BFR, and cross component carrier (cross CC)/BWP BFD.

BFR operation during retransmission of PRACH.

For new beam identification during retransmission of PRACH for BFR, the following two options can be used:

Option 1: the newly identified beam for retransmission of PRACH for BFR can be the same as that for initial transmission; and Option 2: the UE can update the newly identified beam for retransmission of PRACH for BFR.

Figure 9:
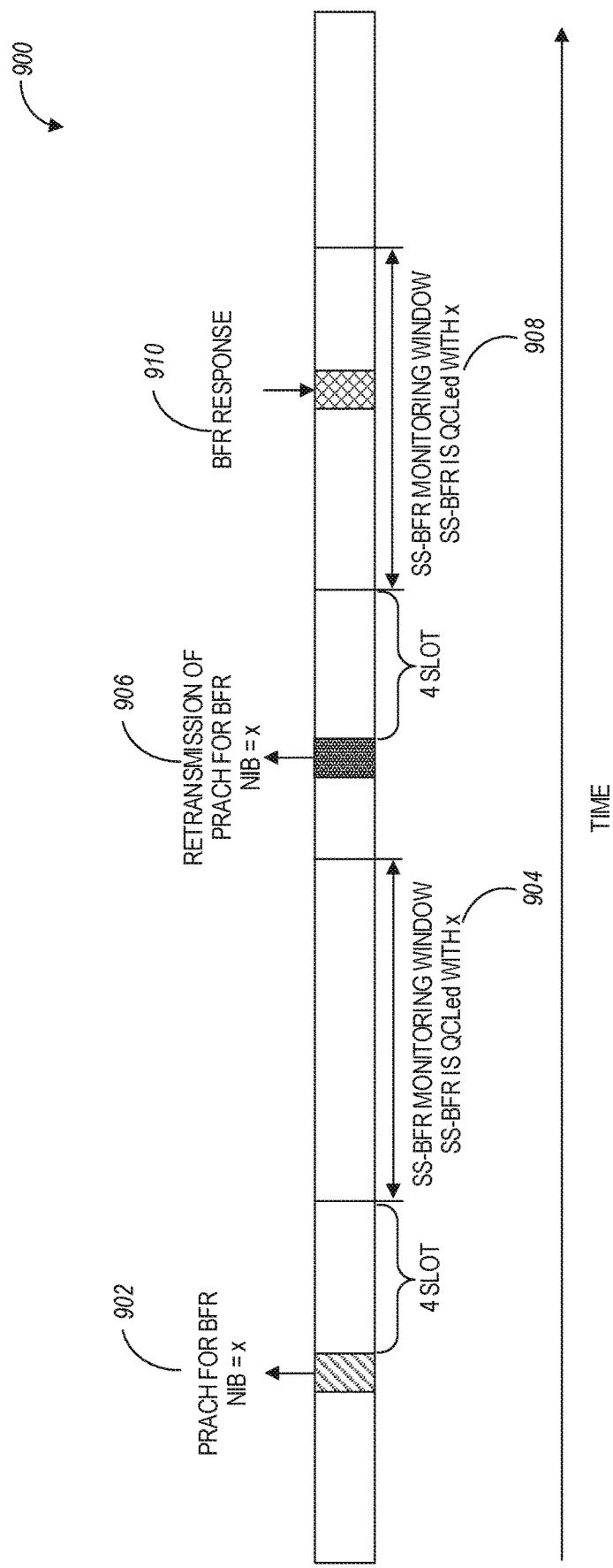
FIG. 9 illustrates an example retransmission of PRACH for BFR in a first option, in accordance with some aspects.

In some aspects, for contention-free PRACH based BFR, the newly identified beam (NIB) can be the same for each transmission instance of PRACH for BFR. In one aspect, the UE can apply the same spatial domain transmission filter (Tx beam) to transmit each instance of PRACH for BFR. In another aspect, the UE can use different spatial domain transmission filters to transmit each instance of PRACH for BFR. FIG. 9 illustrates an example for this aspect.

FIG. 9 illustrates an example retransmission of PRACH for BFR in a first option, in accordance with some aspects. Referring to FIG. 9, PRACH for BFR is transmitted at 902. The SS-BFR monitoring window 904 starts 4 slots after the PRACH transmission at 902. At 906, the PRACH for BFR is re-transmitted. The SS-BFR monitoring window 908 starts 4 slots after the PRACH transmission at 906. A BFR response is received at 910.

Figure 10:
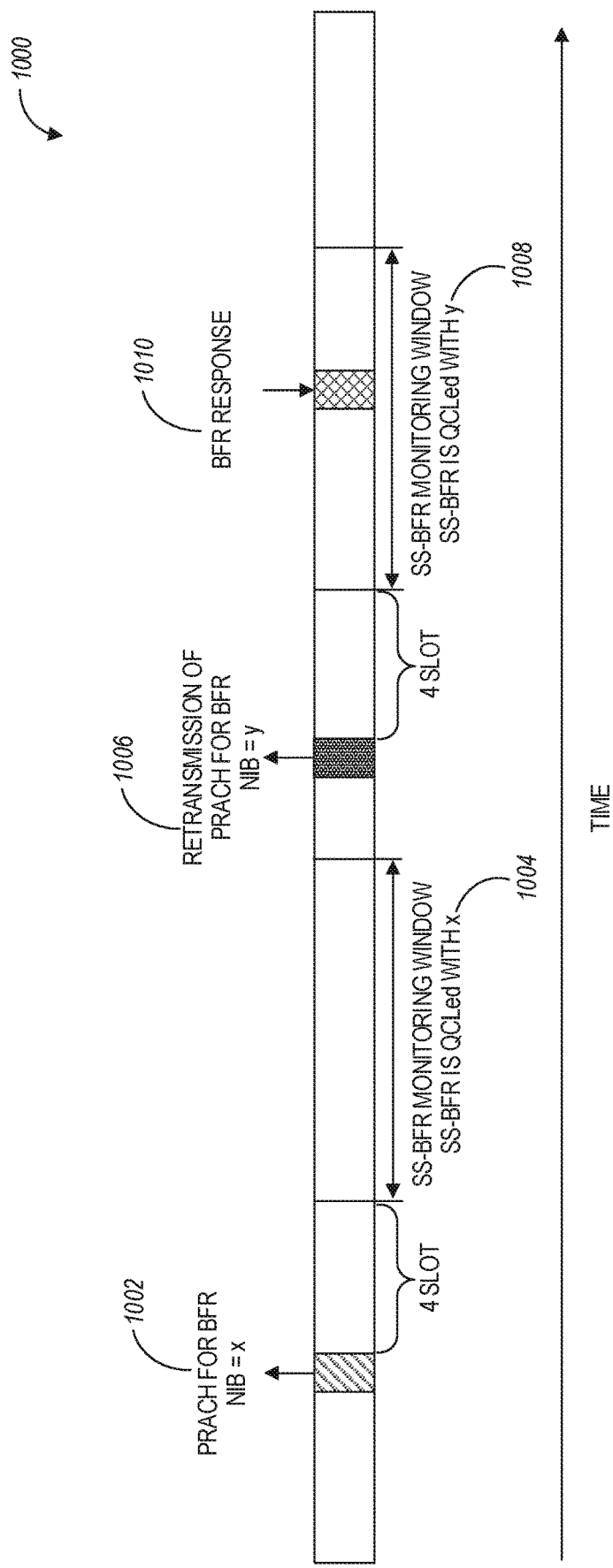
FIG. 10 illustrates an example retransmission of PRACH for BFR in a second option, in accordance with some aspects.

In another aspect, for contention-free PRACH based BFR, the UE can generate each transmission instance based on different newly identified beam. Then the QCL assumption for SS-BFR to monitor the response of one transmission instance of PRACH for BFR can be based on the NIB. The transmission power for different instance of PRACH can be different and the power control for each instance of PRACH can be based on the associated DL RS for NIB. FIG. 10 illustrates an example for this aspect.

FIG. 10 illustrates an example retransmission of PRACH for BFR in a second option, in accordance with some aspects. Referring to FIG. 10, PRACH for BFR (with NIB=x) is transmitted at 1002. The SS-BFR monitoring window 1004 starts 4 slots after the PRACH transmission at 1002 (with SS-BFR being QCLed with x). At 1006, the PRACH for BFR is re-transmitted (with NIB=y). The SS-BFR monitoring window 1008 starts 4 slots after the PRACH transmission at 1006 (with SS-BFR being QCLed with y). A BFR response is received at 1010.

In another aspect, if there is no DCI scrambled by C-RNTI received from SS-BFR after transmitting PRACH for BFR, the UE shall not monitor SS-BFR after the timer configured by beamFailureRecoveryTimer expires, as this timer is used to control the whole contention free based PRACH based BFR procedure. If the timer expires, the UE can use contention-based PRACH based BFR if configured.

In some aspects, if CORESET0 is configured in active BWP or current CC, after K (e.g., K=28) symbols after receiving the beam failure recovery response for the request based on contention-free PRACH, if the PRACH is associated with a CSI-RS or a SSB that is quasi-co-located (QCLed) with an SSB with a subset of or all the parameters including Doppler shift, Doppler spread, average delay, delay spread and spatial Rx parameter, the UE shall assume the CORESET0 should be QCLed with the corresponding SSB/CSI-RS associated with the PRACH.

In some aspects, if CORESET0 is configured in active BWP or current CC, after K (e.g., K=28) symbols after transmitting the beam failure recovery request by contention-based PRACH, the UE shall assume the CORESET0 should be QCLed with the corresponding SSB/CSI-RS associated with the PRACH.

In some aspects, the following could be defined: after 28 symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi-collocation parameters as the ones associated with index $q_{new}$ for PDCCH monitoring in a CORESET with index 0, if $q_{new}$ is based on SS/PBCH block or CSI-RS quasi-collocated with an SS/PBCH block, as described in clause 5.1.5 in 3GPP TS 38.214. In some aspects, as an extension, after K symbols after transmitting the contention based PRACH, the UE shall assume CORESET0 should be QCLed with the corresponding downlink reference signal associated with the PRACH.

Cross-CC BFD Operation

In an embodiment, the DL RS for BFD should not be from other CC/BWP. If no DL RS is explicitly configured for BFD by RRC parameter failureDetectionResources, UE shall expect the parameter cell and bwp-ID is not configured for the RS with QCL-TypeD in QCL-Info in the TCI state for CORESET(s) in active BWP in current CC, i.e. PCell. Alternatively UE shall expect the parameter cell and bwp-ID for TCI state for CORESET(s) in active BWP is configured based on active BWP ID and current CC ID, i.e. PCell. In another option, UE may use DL RS in active BWP in current CC, i.e. PCell, and it shall ignore the RS configured in other CC/BWP.

In some aspects, the following TCI configuration can be used:

```
TCI-State ::=          SEQUENCE {
    tci-StateId            TCI-StateId,
    qcl-Type1              QCL-Info,
    qcl-Type2              QCL-Info
                           OPTIONAL,    -- Need R
    ...
}
QCL-Info ::=           SEQUENCE {
    cell                   ServCellIndex          OPTIONAL,    -
- Need R
    bwp-Id                 BWP-Id          OPTIONAL, -- Cond
CSI-RS-Indicated
    referenceSignal        CHOICE {
        csi-rs                 NZP-CSI-RS-ResourceId,
        ssb                    SSB-Index
    },
    qcl-Type               ENUMERATED {typeA, typeB, typeC,
typeD},
    ...
}
```

In another aspect, the BFD can be based on DL RS in other CC/BWP. Thus, the CC ID and the bandwidth part (BWP) ID can be included in the explicitly configured resource. In an example, the following enhanced BFD RS configuration parameters can be used to configure one DL RS for BFD:

```
RadioLinkMonitoringRS ::=     SEQUENCE {
    radioLinkMonitoringRS-Id      RadioLinkMonitoringRS-Id,
```

```
    purpose           ENUMERATED {beamFailure, rlf,
both},
    cell              ServCellIndex       OPTIONAL, -
- Need R
    bwp-Id            BWP-Id       OPTIONAL, -- Cond
CSI-RS-Indicated
    detectionResource CHOICE {
      ssb-Index         SSB-Index,
      csi-RS-Index      NZP-CSI-RS-ResourceId
    },
    . . .
}
```

In some aspects, a UE includes circuitry to determine the resource for contention-free (CF) physical random access channel (PRACH) based beam failure recovery (BFR). In some aspects, the PRACH resource is based on the newly identified beam (NIB), which shall be the same for each transmission instances of CF-PRACH within a BFR procedure. In some aspects, for each transmission instances of CF-PRACH within a BFR procedure, the UE can select different PRACH resources based on different NIB. In some aspects, the UE may assume that the search space for BFR (SS-BFR) can be quasi-co-located (QCLed) with the NIB associated with the latest CF-PRACH transmission within a SS-BFR monitoring window. In some aspects, if there is no DCI scrambled by C-RNTI received from SS-BFR after transmitting PRACH for BFR, the UE shall not monitor the SS-BFR after the timer configured by beamFailureRecoveryTimer expires. The UE including the circuitry to perform beam failure detection (BFD) when multiple component carriers (CCs) and/or bandwidth parts (BWPs) are configured. In some aspects, in one CC, the UE shall expect that the downlink reference signal (RS) for BFD is not be from other CC/BWP. In some aspects, the UE shall ignore the RS configured in other CC/BWP for BFD. In some aspects, the BFD can be on downlink RS in other CC/BWP. In some aspects, the CC ID and BWP ID can be included in the explicitly configured resource for BFD.

In some aspects, if CORESET0 is configured in active BWP or current CC, after K symbols after receiving the beam failure recovery response for the request based on contention-free PRACH, if the PRACH is associated with an SSB or a CSI-RS that is QCLed with an SSB with a subset of or all the parameters including Doppler shift, Doppler spread, average delay, delay spread and spatial Rx parameter, UE shall assume the CORESET0 should be QCLed with the corresponding SSB/CSI-RS associated with the PRACH. In some aspects, if CORESET0 is configured in active BWP or current CC, after K symbols after transmitting the beam failure recovery request by contention-based PRACH, the UE shall assume the CORESET0 would be QCLed with the corresponding SSB/CSI-RS associated with the PRACH. In some aspects, after K symbols after transmitting the contention based PRACH, the UE shall assume CORESET0 should be QCLed with the corresponding downlink reference signal associated with the PRACH.

SRS based beam failure recovery indication techniques are disclosed. Beam Management (BM) is a feature introduced by 5G NR. Beam failure detection (BFD) and beam Failure Recovery (BFR) are features associated with 5G NR BM framework. In 5G NR, on downlink (DL) carriers, the UE monitors the radio link quality via measurements on a set $\bar{q}_0$ of predefined periodic CSI-RS resources or SS/PBCH blocks. A second set $\bar{q}_1$ of CSI-RS resource configuration indexes and/or SS/PBCH block indexes is configured from the network to the UE for radio link quality measurements of other candidate beams. During periodic measurements, if the radio link quality of all resource configurations in the set $\bar{q}_0$ is worse than a threshold, then a beam failure has been detected. In case of beam failure, the UE can be configured to identify a new periodic CSI-RS configuration index or SS/PBCH block index ($q_{new}$) from the set $\bar{q}_1$. Afterwards, the UE may indicate the identified new beam index $q_{new}$ throughput uplink (UL) channel to the gNB in order to recover the beam. In some aspects, the indication of $q_{new}$ is carried by uplink transmission of PRACH signals from UE to the gNB. BFR indication can be based on contention based PRACH (CB-PRACH) or contention free PRACH (CF-PRACH).

The PRACH based BFR indication may be associated with the following shortcomings: (1) In mmWave band communications, for low-cost UEs which do not hold UL/DL correspondence, the PRACH based BFR indication may not be robust (since the identified new beam $q_{new}$ is only based on DL measurements by UE). When the identified new beam is used for spatial domain TX filter setting for PRACH transmission, it cannot guarantee that gNB can reliably receive the BFR indication, when UL/DL correspondence is not on hold. (2) Only a single beam (indicated by a single resource index $q_{new}$) can be proposed from UE to gNB for beam failure recovery.

SRS based BFR indication techniques are disclosed herein. In some aspects, based on UL BM framework, each SRS resource can be directly or indirectly (through inter-SRS resource association) associated to a DL CSI-RS or SS/PBCH block resource index based on spatialRelationInfo configuration by RRC signaling. Therefore, the UE can transmit an SRS resource, which is associated with the identified $q_{new}$ (or q_new) for BFR indication.

Since multiple SRS resources can be transmitted within one UL slot, in one aspect, multiple SRS resources associated to a same q_new can be transmitted with different TX beams (TX beam sweeping) which increases the robustness for BFR indication. As another option, multiple SRS resources associated to more multiple q_new indexes can be transmitted with different TX beams which increases the capacity of new beam candidates that UE can indicate for gNB selection from for beam recovery.

In some aspects, the techniques disclosed herein are associated with the following advantages: (1) Robust BFR indication in mmWave bands when UE does not hold UL/DL correspondence; (2) Capability of indicating multiple candidate new beams to enable gNB selection; and (3) Better user experience and fast BFR due to shorter indication time with better robustness.

In some aspects, in a 3GPP 5G NR UL BM framework, a structure of spatialRelationInfo is provided by gNB to UE through RRC messages, which contains the spatial resource association between each SRS resource and a reference resource. The reference resource can be CSI-RS resource or SS/PBCH block resource or another SRS resource.

Figure 11:
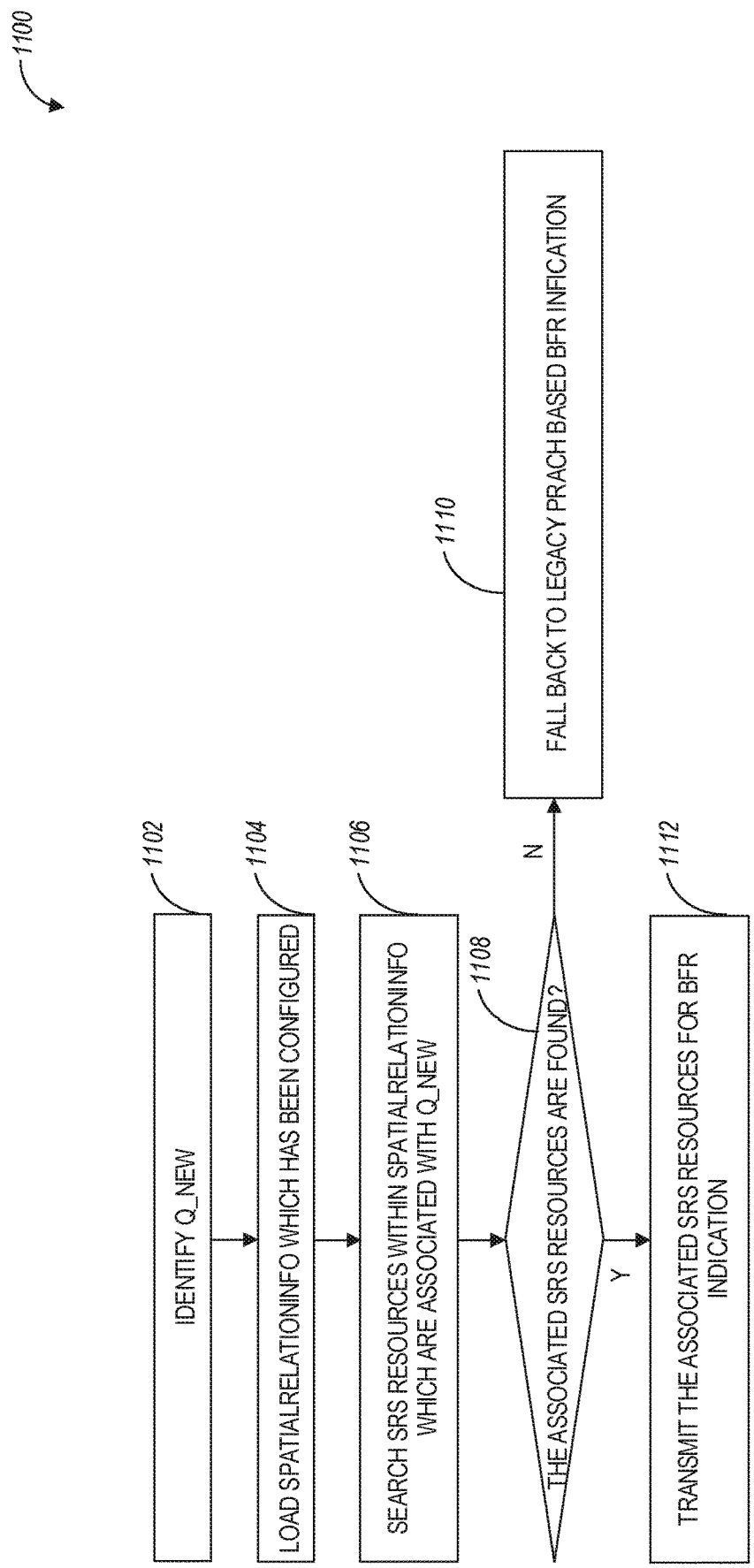
FIG. 11 illustrates a flowchart of an example method for sounding reference signal (SRS)-based BFR indication at the UE side, in accordance with some aspects.

FIG. 11 illustrates a flowchart of an example method 1100 for sounding reference signal (SRS)-based BFR indication at the UE side, in accordance with some aspects. When the UE has identified a new beam index q_new (e.g., at operation 1102), it searches within spatialRelationInfo which SRS resources are associated to q_new, and transmits the identified SRS resources for beam failure recovery (BFR) indication.

More specifically, at operation 1104, spatialRelationInfo is loaded. At operation 1106, SRS resources associated with q_new are searched within spatialRelationInfo. At operation

1108, it is determined if the associated SRS resources are found. If the SRS resources are not found, at operation 1110, a fall back to legacy PRACH based BFR indication takes place. If the SRS resources are found, at operation 1112, the associated SRS resources are transmitted for BFR indication. When the associated SRS resources are not found, UE falls back to the legacy PRACH based BFR indication. When more than one SRS resource within an SRS resource set are identified for FR indication, they can be transmitted in time-multiplexed manner using different UE TX beams, which results in improved robustness for BFR indication.

In some aspects, a UE can also indicate multiple q_new indices while each index is associated to a different SRS resource. The maximal number of indicated q_new indices can be indicated by gNB to UE through high layer signaling.

In some aspects, the gNB has the information of the configured $\bar{q}_1$ from which q_new is selected from, and it also has the information of the configured spatialRelationInfo. In this regard, the gNB is aware of whether the UE is using SRS based BFR indication or legacy PRACH based BFR indication. In case of SRS based BFR indication is selected, the gNB can blindly detect the resource indices of the received SRS resources (e.g., by correlations with different SRS sequence templates each mapped to one resource index). The gNB can then identify q_new from the detected SRS resource indexes, through the resource association mapping in spatialRelationInfo. An example procedure for this technique is illustrated in FIG. 12.

Figure 12:
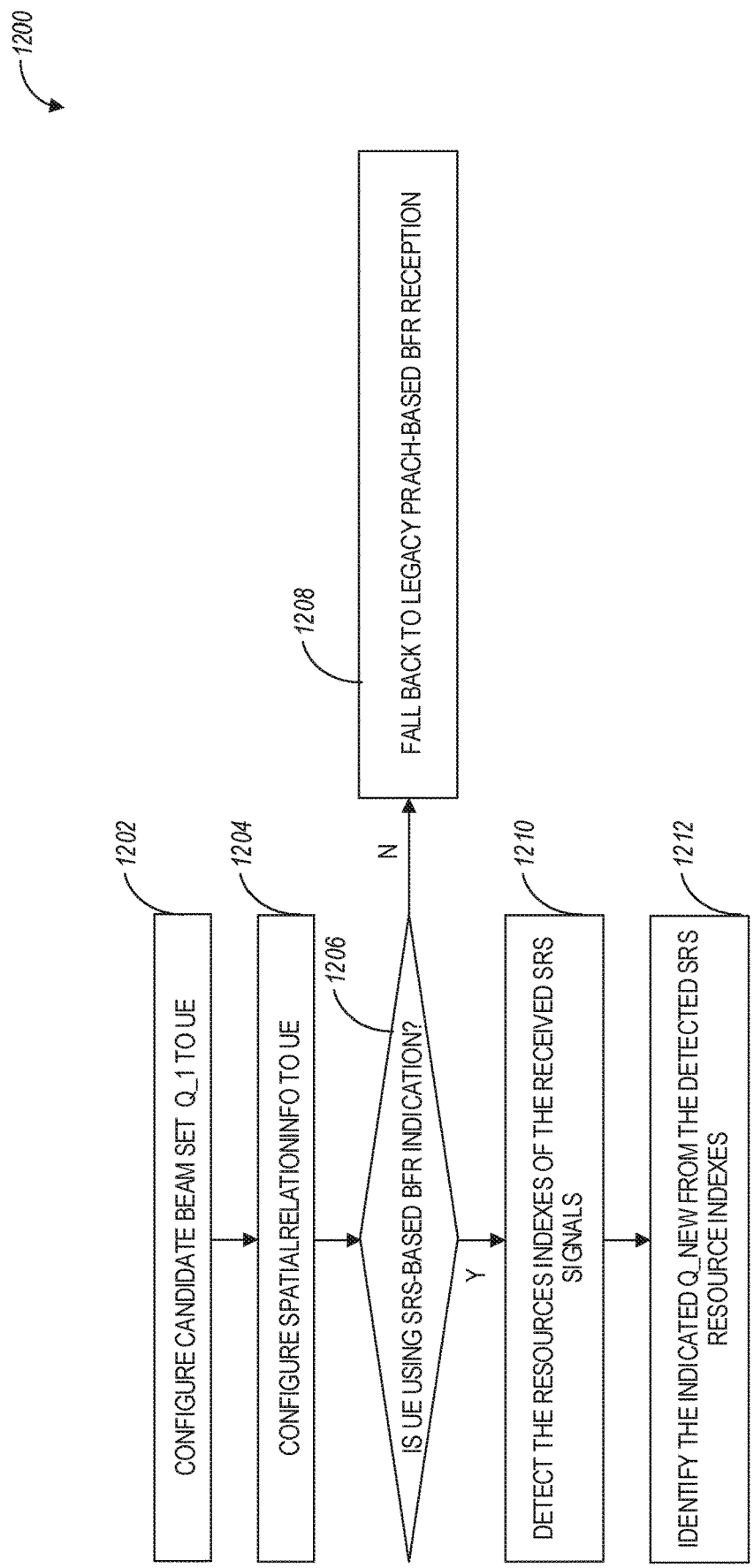
FIG. 12 illustrates a flowchart of an example method for sounding reference signal (SRS)-based BFR indication at the base station side, in accordance with some aspects.

FIG. 12 illustrates a flowchart of an example method 1200 for sounding reference signal (SRS)-based BFR indication at the base station side, in accordance with some aspects. Referring to FIG. 12, the method 1200 starts at operation 1202, when a candidate beam set q_1 is configured to the UE. At operation 1204, spatialRelationInfo is configured to the UE. At operation 1206, it can be determined whether the UE is using SRS-based BFR indication. If the UE is not using SRS-based BFR indication, at operation 1208, processing can fall back to legacy PRACH-based BFR reception. If the UE is using SRS-based BFR indication, at operation 1210, the resources indexes of the received SRS signals are detected. At operation 1212, the indicated q_new is identified from the detected SRS resources indexes.

In some aspects, the gNB can directly indicate a set of BFR SRS resources by high layer signaling (e.g. RRC or MAC CE) while each indicated SRS resource is associated to an index within the set $\bar{q}_1$. The association information of the new BFR SRS resources can override the association information from spatialRelationInfo.

In some aspects, in carrier aggregation scenarios, for BFR indication for one failed component carrier (CC), when another CC is still in good link quality, SRS resources can be transmitted in the good quality CC, in which the selected SRS resources are cross-CC associated with the identified new beam indexes $q_{new}$ in failed CCs.

In some aspects, in carrier aggregation scenarios, for BFR indication for one failed component carrier (CC), when another CC is still in good link quality, we further propose to transmit PUCCH in the good quality CC. The transmitted PUCCH contains the identified new beam indexes, the cell index of the beam failed CC, and optionally, the associated L1-RSRP measurement for the identified new beam indexes.

A base station (BS) configures a BFR SRS resource set to UE through high layer signaling, in which each SRS resource within the set is associated to an index within candidate beam downlink resource set ($\bar{q}_1$). The BS can configure the UE about the maximal number of new beam indexes ($q_{new}$) in BFR indication through high layer signaling. The maximal number can be higher than 1. In some aspects, the UE dynamically determines PRACH or SRS resources for beam failure recovery (BFR) indication. In some aspects, the decision can be based on the availability of the configured SRS resources which are associated with the identified new beam index ($q_{new}$). In some aspects, the association information can be derived by spatialRelationInfo configured by RRC messages. In some aspects, the association information can be derived by configured BFR SRS resource set information. When available, it overrides the association information. In some aspects, when multiple SRS resources from the same SRS resource set are identified which are associated to a same new beam index ($q_{new}$), the UE can transmit those SRS resources in a time-multiplexed manner with different UE spatial domain TX filtering settings. In some aspects, the BS detects the resource indexes of the received SRS signals, and then identifies the indicated new beam index(es) from the detected SRS resource indexes. In some aspects, when SRS resources are decided for BFR indication for a one beam failed component carrier (CC), the selected SRS resources can be transmitted in a different CC, which are cross-component-carrier associated with the identified $q_{new}$ from the beam failed CC. In some aspects, the UE transmits PUCCH in one CC, which contains the BFR indication for a different CC. In some aspects, the PUCCH can contain a cell index of the beam failed CC, the identified new beam indexes for the beam failed CC, and optionally the L1-RSRP values for the identified new beam indexes.

Figure 13:
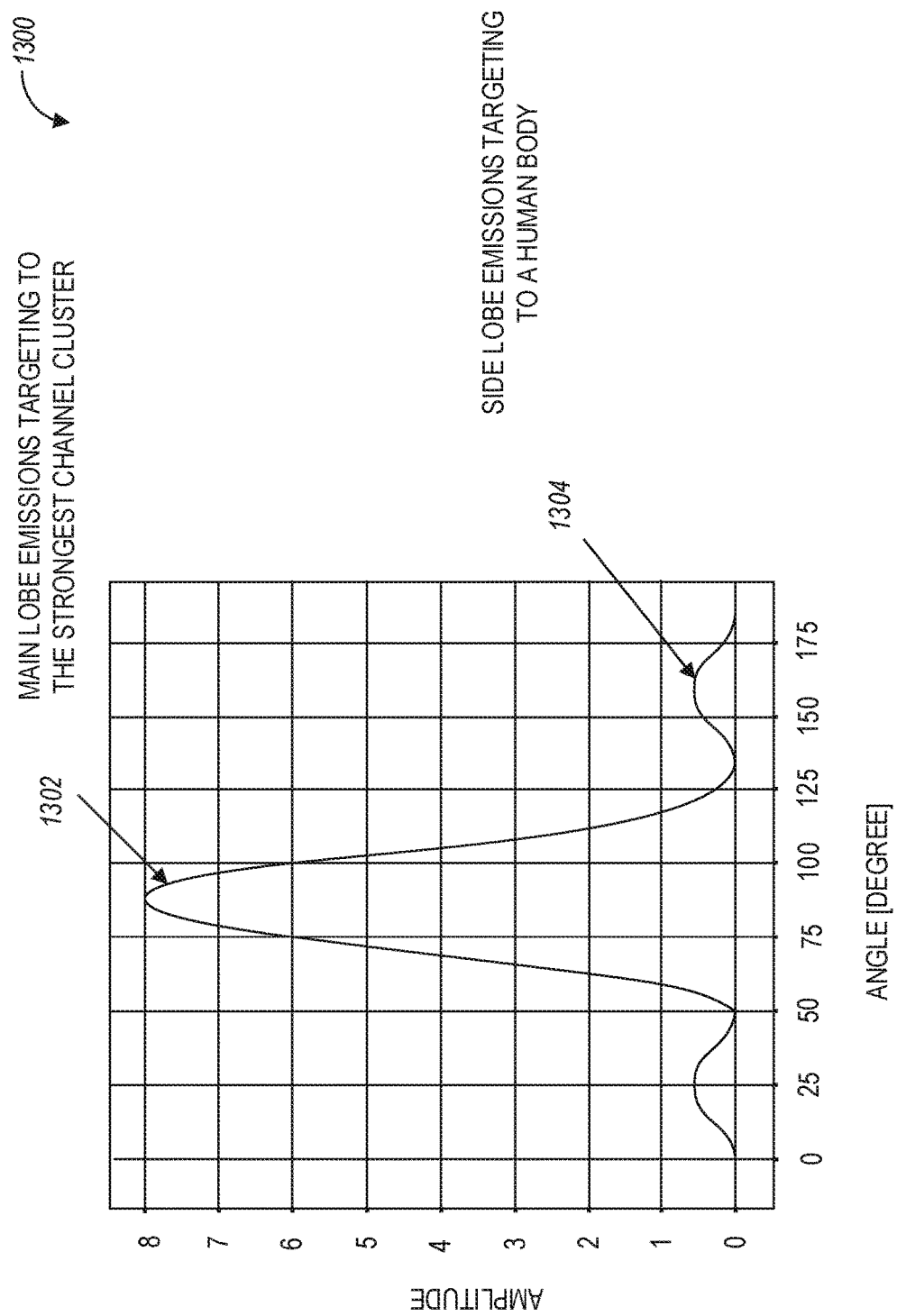
FIG. 13 illustrates a graph of example beam emissions, in accordance with some aspects.

Techniques for emission and panel aware beam selection are disclosed herein. In some aspects associated with uplink beam management, a gNB can use a synchronization signal block (SSB) index, a channel state information reference signal (CSI-RS) resource index, or a sounding reference signal (SRS) resource index for uplink beam indication. If an SRS Resource Index (SRI) is indicated, the LE can apply the same spatial domain transmission filter (Tx beam) to the indicated uplink signal as the SRS resource indicated by SRI. If an SSB/CSI-RS index is indicated, the UE can apply the same Tx beam to the indicated uplink signal as the spatial domain receiving filter (Rx beam) as the indicated SSB/CSI-RS. However, if SSB/CSI-RS is indicated, the gNB has no information on the UE beam. Consequently, the following two issues can be of importance:

(1) There could be some emission for a particular UE beam, which is targeting (or harmful) to the human body. FIG. 13 illustrates a graph 1300 of example beam emissions, in accordance with some aspects. As shown in FIG. 13, a main signal lobe 1302 is associated with signal emissions targeting to the strongest channel cluster. FIG. 13 also illustrates a side lobe 1304, which may be targeting to the human body (i.e., the signal beam associated with this lobe can be considered as "not safe" or harmful).

(2) It is unknown which antenna panel(s) the UE would use to receive indicated SSB/CSI-RS. Then which antenna panel(s) the UE Tx beam should be from is unknown to the gNB so that the gNB cannot control the interference and cannot select a multi-panel transmission operation.

In addition, due to movement and rotation of the device (UE) user, some (or all) of the current UE beams may point to the human body. In this case, the UE cannot find a way to communicate with the gNB in the uplink, and consequently, some uplink beam recovery may be necessary.

Techniques disclosed herein can be used to enable emission and panel aware beam selection, including UE reported information on beam emission status and panel information, and control signaling on beam and panel indication.

Figure 14:
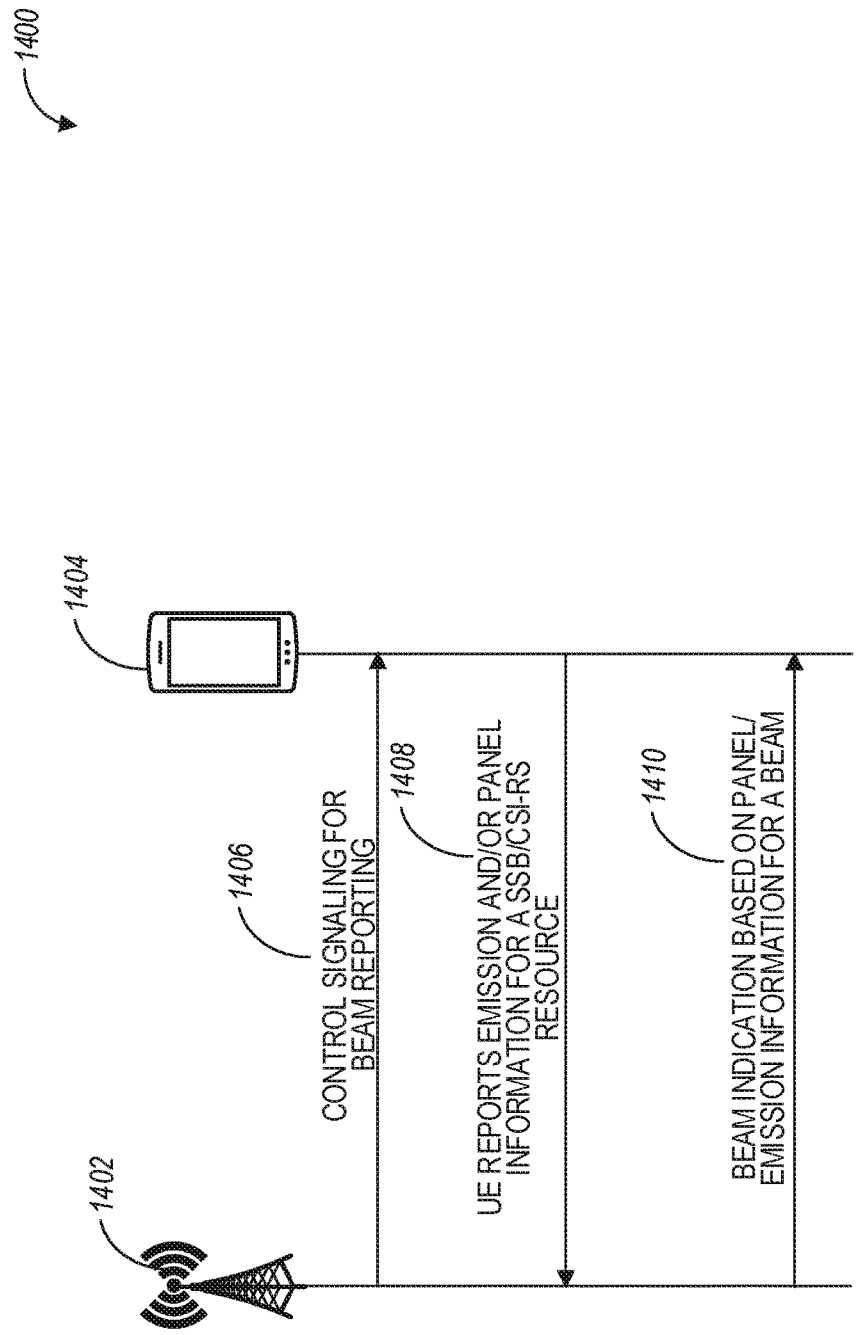
FIG. 14 illustrates a communication exchange for an example procedure for emission or panel-aware based beam selection, in accordance with some aspects.

The gNB has no information on the emission and the UE antenna panel(s) for a UE beam. Therefore, in an initial first step, the UE can report some information (e.g., CSI report). In some aspects, the second step is to utilize gNB control signaling on beam indication based on the UE reported information. In some aspects, a UE panel (or antenna panel) can be considered as a UE antenna port(s) group. FIG. 14 illustrates the procedure for emission aware and panel aware based beam selection.

FIG. 14 illustrates a communication exchange for an example procedure 1400 for emission or panel-aware based beam selection, in accordance with some aspects. Referring to FIG. 14, the procedure 1400 may take place between a base station (e.g., a gNB) 1402 and a UE 1404 (or any other UEs discussed herein). The procedure 1400 may start at operation 1402, when control signaling for beam reporting is communicated from the base station 1402 to the UE 1404.

In some aspects, for a beam reporting, the gNB 1402 can indicate whether the UE should report the emission and/or panel related information for a beam by RRC signaling or medium access control—control element (MAC-CE) signaling, or Downlink Control Information (DCI) signaling, or a combination thereof.

In some aspects, the gNB 1402 can indicate whether the reported beam can be selected for uplink transmission. If it is configured that the reported beam can be selected for uplink transmission, the reported beam in a corresponding beam reporting instance can should be emission-safe; otherwise, the reported beam may not be used for uplink transmission so that this beam reporting instance can be considered as for downlink beam selection only.

In some aspects, the gNB 1402 can indicate whether the UE 1404 should report whether one reported SSB/CSI-RS index can be selected for uplink beam indication. Additionally, the gNB 1402 can indicate whether the UE 1404 should report which UE antenna panel(s) the SSB/CSI-RS is measured from. As used herein, the terms "antenna panel" and "panel" are synonymous.

At operation 1408, the UE 1404 reports emission or panel information for an SSB/CSI-RS resource (e.g., as identified by an SSB resource index, or SSBRI, or CSI-RS resource index, or CRI).

In some aspects, in each beam reporting instance, if configured, the UE 1404 can report whether the SSB/CSI-RS resource can be used for uplink beam indication. Table 2 illustrates one example on UE beam reporting information, where CRI indicates a CSI-RS Resource Index and SSBRI indicates an SSB Resource Index. The flag could take 1-bit, where value 0 may indicate the reported beam cannot be used for uplink beam indication and a value 1 may indicate the reported beam can be used for uplink beam indication.

TABLE 2 an example for UE beam reporting with flag for uplink beam indication:

| CSI report number | CSI fields |
|---|---|
| CSI report #n | CRI or SSBRI #1, if reported |
| | CRI or SSBRI #2, if reported |
| | CRI or SSBRI #3, if reported |
| | CRI or SSBRI #4, if reported |
| | RSRP #1, if reported |
| | Differential RSRP #2, if reported |
| | Differential RSRP #3, if reported |
| | Differential RSRP #4, if reported |

TABLE 2-continued an example for UE beam reporting with flag for uplink beam indication:

| CSI report number | CSI fields |
|---|---|
| | Flag on whether the CRI or SSBRI #1 can be used for uplink spatial relation indication, if reported |
| | Flag on whether the CRI or SSBRI #2 can be used for uplink spatial relation indication, if reported |
| | Flag on whether the CRI or SSBRI #3 can be used for uplink spatial relation indication, if reported |
| | Flag on whether the CRI or SSBRI #4 can be used for uplink spatial relation indication, if reported |

Alternatively, for each CRI/SSBRI, the UE can report a maximum power reduction (MPR) level to the gNB. Then to reduce emission, the uplink maximum transmission power could be reduced if a corresponding beam is indicated. Table 3 illustrates one example for MPR based beam reporting. Table 4 illustrates one example for MPR indication.

TABLE 3 an example for UE beam reporting with MPR information:

| CSI report number | CSI fields |
|---|---|
| CSI report #n | CRI or SSBRI #1, if reported |
| | CRI or SSBRI #2, if reported |
| | CRI or SSBRI #3, if reported |
| | CRI or SSBRI #4, if reported |
| | RSRP #1, if reported |
| | Differential RSRP #2, if reported |
| | Differential RSRP #3, if reported |
| | Differential RSRP #4, if reported |
| | MPR for CRI or SSBRI #1, if reported |
| | MPR for CRI or SSBRI #2, if reported |
| | MPR for CRI or SSBRI #3, if reported |
| | MPR for CRI or SSBRI #4, if reported |

TABLE 4 an example for MPR indication:

| MPR bits | Indication |
|---|---|
| 00 | MPR = 0 dB |
| 01 | MPR = 3 dB |
| 10 | MPR = 6 dB |
| 11 | Not used for uplink spatial relation info indication |

In some aspects, the UE may report the panel index(es) for a beam in beam reporting if configured. Table 5 illustrates an example for beam reporting with UE panel information. Table 6 illustrates an example for the indication of the UE antenna port(s) group in a beam reporting.

TABLE 5 an example for beam reporting with UE panel information:

| CSI report number | CSI fields |
|---|---|
| CSI report #n | CRI or SSBRI #1, if reported |
| | CRI or SSBRI #2, if reported |
| | CRI or SSBRI #3, if reported |

TABLE 5-continued an example for beam reporting with UE panel information:

| CSI report number | CSI fields |
|---|---|
| | CRI or SSBRI #4, if reported |
| | RSRP #1, if reported |
| | Differential RSRP #2, if reported |
| | Differential RSRP #3, if reported |
| | Differential RSRP #4, if reported |
| | UE antenna port(s) group(s) for CRI or SSBRI #1, if reported |
| | UE antenna port(s) group(s) for CRI or SSBRI #2, if reported |
| | UE antenna port(s) group(s) for CRI or SSBRI #3, if reported |
| | UE antenna port(s) group(s) for CRI or SSBRI #4, if reported |

TABLE 6 an example for indication of UE antenna port(s) group(s):

| UE antenna port(s) group(s) indicator | Indication |
|---|---|
| 00 | Antenna port(s) group 1 |
| 01 | Antenna port(s) group 2 |
| 10 | Antenna port(s) group 1 and 2 |
| 11 | reserved |

AT operation 1410, the gNB 1402 communicates a beam indication based on the panel/emission information for a beam.

In some aspects, for uplink beam indication, the gNB 1402 can indicate the UE antenna port(s) group(s) for each uplink beam for PUSCH/SRS/PUCCH/PRACH by RRC signaling and/or MAC CE and/or DCI. An example for the spatial relation info configuration for SRS, PUCCH and PRACH is configured using the following configuration signaling:

```
            SRS configuration:
SRS-SpatialRelationInfo ::=        SEQUENCE {
  servingCellId                      ServCellIndex
    OPTIONAL,    -- Need S
  referenceSignal                    CHOICE {
    ssb-Index                          SSB-Index,
    csi-RS-Index                       NZP-CSI-RS-ResourceId,
    srs                                SEQUENCE {
      resourceId                         SRS-ResourceId,
      uplinkBWP                          BWP-Id
    }
  }
  antennaPortsGroups                 ENUMERATED { g1, g2, g1&2 }
    OPTIONAL.,    -- Need S
}
            PUCCH configuration:
PUCCH-SpatialRelationInfo ::=      SEQUENCE {
  pucch-SpatialRelationInfoId        PUCCH-SpatialRelationInfoId,
  servingCellId                      ServCellIndex
       OPTIONAL,   -- Need S
  referenceSignal                    CHOICE {
    ssb-Index                          SSB-Index,
    csi-RS-Index                       NZP-CSI-RS-ResourceId,
    srs                                SEQUENCE {
                                         resource
    SRS-ResourceId,
                                         uplinkBWP
    BWP-Id
                                       }
  },
  pucch-PathlossReferenceRS-Id       PUCCH-PathlossReferenceRS-Id,
  p0-PUCCH-Id                        P0-PUCCH-Id,
  closedLoopIndex                      ENUMERATED { i0, i1 }
  antennaPortsGroups                 ENUMERATED { g1, g2, g1&2 }
     OPTIONAL.,    -- Need S
}
            PRACCH configuration:
CFRA-SSB-Resource ::=              SEQUENCE {
  ssb                                SSB-Index,
  ra-PreambleIndex                   INTEGER (0..63),
  antennaPortsGroups                 ENUMERATED { g1, g2, g1&2 }
     OPTIONAL,    -- Need S
  ...
}
CFRA-CSIRS-Resource ::=            SEQUENCE {
  csi-RS                             CSI-RS-index,
  ra-OccasionList                    SEQUENCE (SIZE(1..maxRA-
OccasionsPerCSIRS)) OF INTEGER (0..maxRA-Occasions-1),
  ra-PreambleIndex                   INTEGER (0..63),
  antennaPortsGroups                 ENUMERATED { g1, g2, g1&2 }
     OPTIONAL    -- Need S
  ...
}
```

In some aspects, the antenna port(s) group(s) can also be indicated for each SRS resource set. There could be multiple SRS resource sets configured for uplink codebook and non-codebook based transmission. The antenna port(s) could be configured to be different in different SRS resource sets to support uplink panel selection.

In some aspects, for PDCCH ordered PRACH, the antenna port group index could be indicated by downlink control information (DCI). In one example, for a 2 panel UE, the following could be configured in DCI to trigger PRACH: SS/PBCH block (SSB) index, a PRACH mask, and an antenna port group index.

In some aspects, the UE would transmit the PRACH based on the Tx beam associated with the SSB index indicated by DCI from the panel indicated by antenna. port group index. Alternatively, the PRACH could be transmitted from the indicated panel with the Tx beam associated with the reference signal configured in Transmission Configuration Indication (TCI) state of the corresponding PDCCH that triggers PRACH.

In some aspects, the antenna port group index for PDCCH ordered PRACH can be configured by higher layer signaling or based on the latest reported panel index in beam reporting for the correspondence SSB, or based on the indicated spatial relation info which is based on the indicated SSB.

In some aspects, the transmission from an antenna port group index as disclosed herein can be considered as an uplink transmission entity. Uplink transmission from different antenna port indexes could be considered as different uplink transmission entities.

Figure 15:
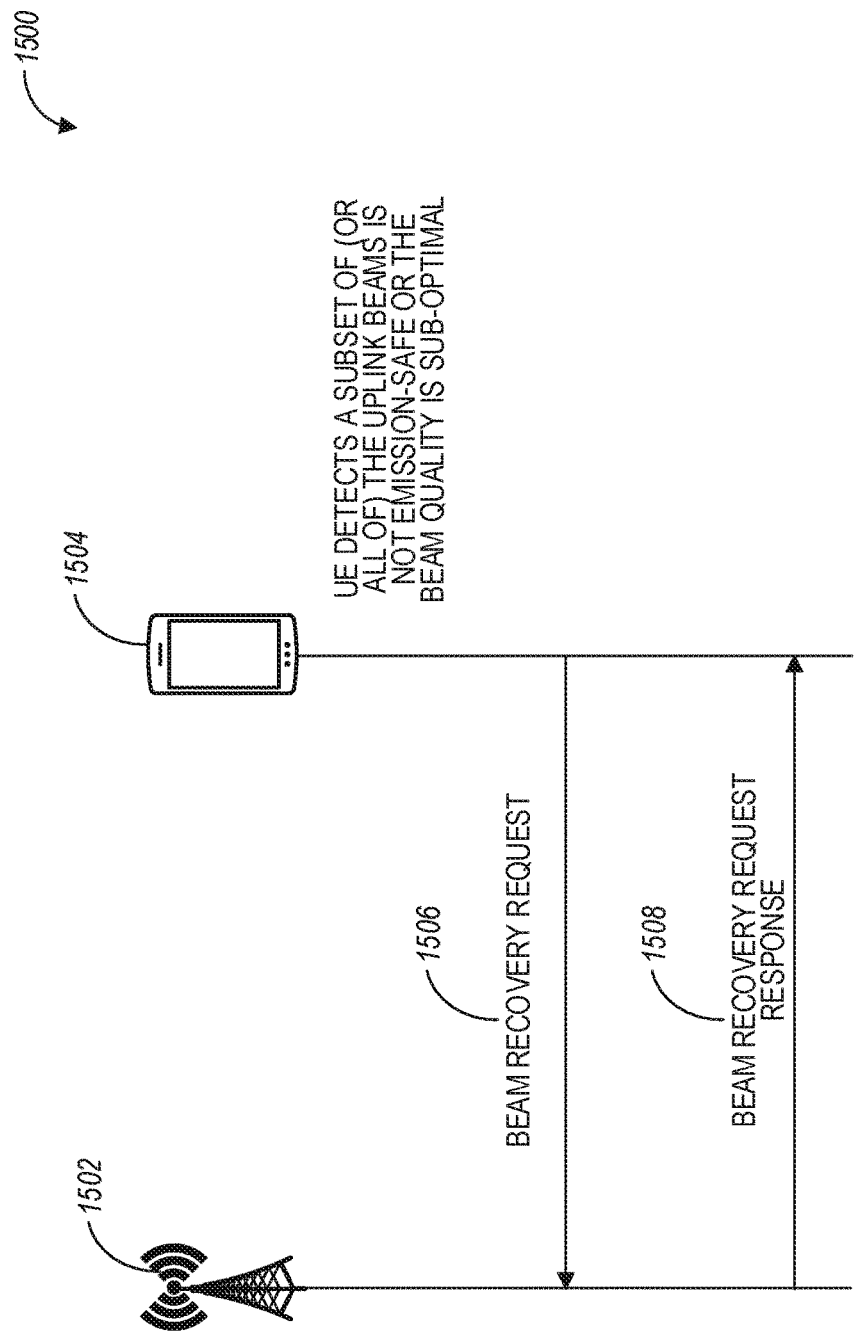
FIG. 15 illustrates a communication exchange for an example procedure for uplink beam recovery, in accordance with some aspects.

As a result of UE's movement or rotation, current uplink beam(s) may not be emission-safe. Consequently, the UE cannot use current uplink beam(s) to transmit uplink signal. The UE can then attempt to recover the uplink beam by an uplink beam recovery procedure. FIG. 15 illustrates the procedure for uplink beam recovery.

FIG. 15 illustrates a communication exchange for an example procedure 1500 for uplink beam recovery, in accordance with some aspects. Referring to FIG. 15, the procedure 1500 takes place between a base station (e.g., a gNB) 1502 and a UE 1504. The procedure 1500 may start at operation 1506, when a UE detects that a subset of (or all of) the uplink beams is not emission-safe, or the beam quality is sub-optimal. In this case, the UE communicates a beam recovery request to the gNB. In response, at operation 1508, a beam recovery request response is communicated back to the UE 1504 from the gNB 1502.

In some aspects, the beam recovery request can be carried by PUCCH or PRACH, which is used to identify SSB or CSI-RS resource index(es) for uplink beam indication. For PUCCH based scheme, the SSB/CSI-RS resource index(es) can be explicitly indicated. The failed SSB/CSI-RS resource index(ex) for uplink beam indication may also be transmitted. For PRACH based scheme, the SSB/CSI-RS resource index can be identified based on the PRACH resource index.

In some aspects, the beam recovery request response can be carried by a PDCCH scrambled by C-RNTI or a predefined/configured RNTI. This response can be transmitted in a dedicated search space or control resource set configured by higher layer signaling or all the configured search spaces. After receiving a reconfiguration of uplink beam for uplink signal, a UE can consider the uplink beam has been recovered.

In some aspects, if no beam recovery request response is received in a configured time window, the UE can retransmit the uplink beam recovery request. In some aspects, a UE may be allowed for N times retransmission, where N can be predefined or configured by higher layer signaling.

In some aspects, the UE includes circuitry to report information on beam emission, to report information on panel selection, and to determine the beam and panel for downlink reception and uplink transmission. In some aspects, for a beam reporting, the gNB can indicate whether the UE should report the emission and/or panel related information for a beam by RRC signaling or medium access control—control element (MAC-CE), or Downlink Control Information (DCI), or a combination thereof. In some aspects, the gNB can indicate whether the reported beam can be selected for uplink transmission. In some aspects, if it is configured that the reported beam can be selected for uplink transmission, the reported beam in corresponding beam reporting instance should be emission-safe; otherwise, the reported beam may not be used for uplink transmission so that this beam reporting instance can be considered as for downlink beam selection only. In some aspects, the gNB can indicate whether UE should report whether one reported SSB/CSI-RS index can be selected for uplink beam indication. In some aspects, in each beam reporting instance, if configured, UE can report whether the SSB/CSI-RS resource can be used for uplink beam indication. In some aspects, for each CRI/SSBRI, the UE can report a maximum power reduction (MPR) level to gNB. In some aspects, for uplink beam indication, the gNB can indicate the UE antenna port(s) group(s) for each uplink beam for PUSCH/SRS/PUCCH/PRACH by RRC signaling, and/or MAC CE, and/or DCI. In some aspects, the antenna port(s) group(s) can also be indicated for each SRS resource set. In some aspects, a UE may be configured with multiple SRS resource sets for codebook based or non-codebook based transmission. In some aspects, the beam recovery request can be carried by PUCCH or PRACH, which is used to identify SSB or CSI-RS resource index(es) for uplink beam indication. In some aspects, for PUCCH based scheme, the SSB/CSI-RS resource index(es) can be explicitly indicated. The failed SSB/CSI-RS resource index(ex) for uplink beam indication may also be transmitted. In some aspects, the beam recovery request response can be carried by a PDCCH scrambled by C-RNTI, or a predefined/configured RNTI. In some aspects, the response can be transmitted in a dedicated search space or control resource set configured by higher layer signaling or all the configured search spaces.

In some aspects, if no beam recovery request response is received in a configured time window, the UE can retransmit the uplink beam recovery request. In some aspects, a UE is allowed for N times retransmission, where N can be predefined or configured by higher layer signaling. In some aspects, for PDCCH ordered PRACH, the antenna port group index could be indicated by downlink control information (DCI). In some aspects, the UE transmits the PRACH based on the Tx beam associated with the SSB index indicated by DCI from the panel indicated by antenna port group index. In some aspects, the PRACH can be transmitted from the indicated panel with the Tx beam associated with the reference signal configured in Transmission Configuration Indication (TCI) state of the corresponding PDCCH that triggers PRACH. In some aspects, the antenna port group index for PDCCH ordered PRACH can be configured by higher layer signaling. In some aspects, the antenna port group index for PDCCH ordered PRACH can be based on the latest reported panel index in beam reporting for the correspondence SSB. In some aspects, the antenna port group index for PDCCH ordered PRACH can be based on the indicated spatial relation info which is based on the indicated SSB.

Techniques for single beam operation and downlink beam management with low overhead and latency are disclosed herein. In some aspects, beam measurement and reporting can be based on Synchronization Signal Block (SSB) and Channel State Information Reference Signal (CSI-RS). A gNB can apply different beams in different SSB/CSI-RS resources, where one CSI-RS resource can take one symbol and one SSB resource can take 4 symbols. The UE can measure and report the Layer 1 Reference Signal Receiving Power (L1-RSRP) for each resources so that gNB can understand the quality of each beam. Furthermore, the UE can use different receiving beam to receive different CSI-RS resources to find a good UE beam.

Figure 16:
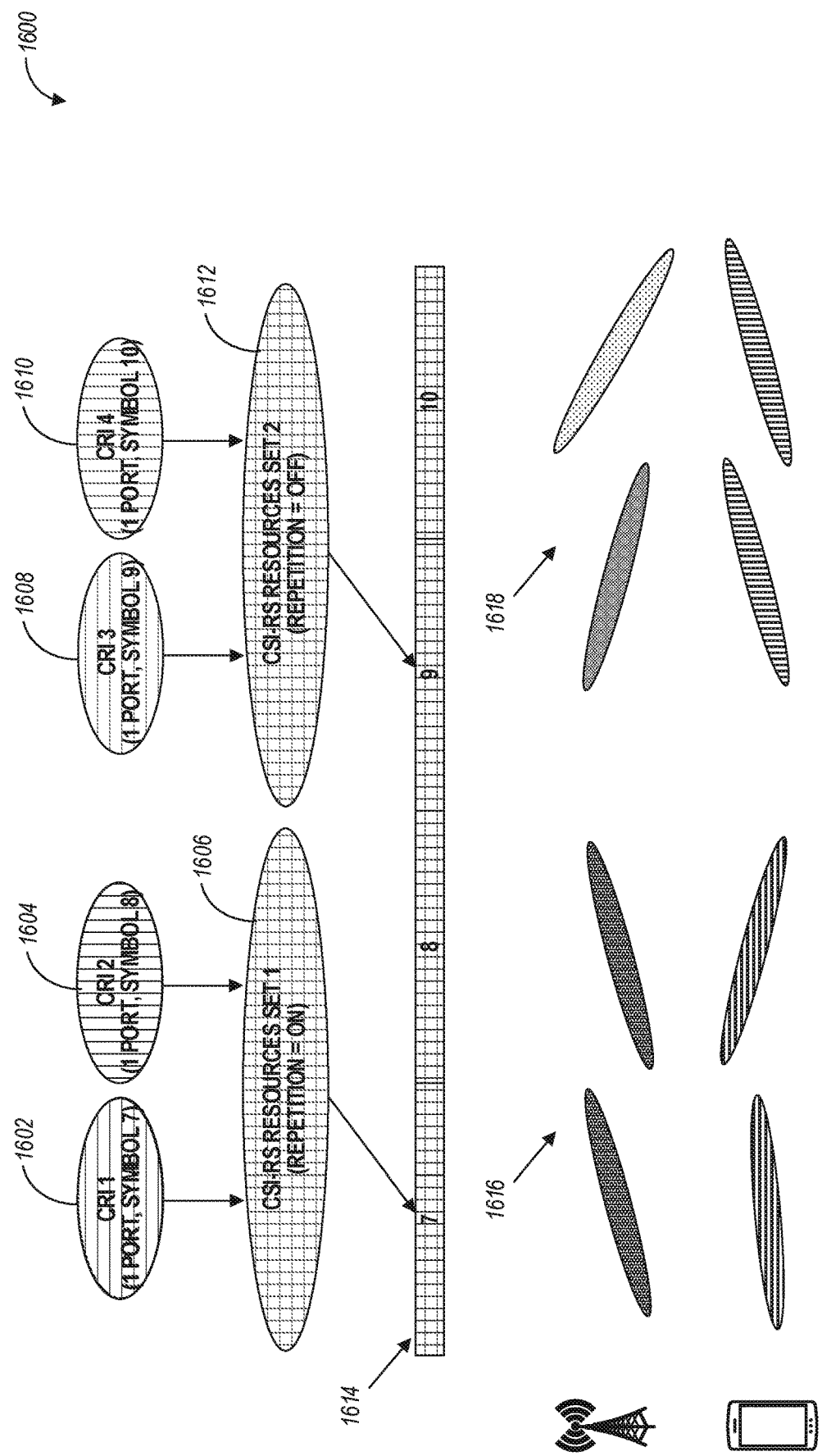
FIG. 16 illustrates an example beam management framework, in accordance with some aspects.

FIG. 16 illustrates an example beam management framework 1600, in accordance with some aspects. For different CSI-RS resources, which is identified based on CSI-RS Resource Index (CRI), when they are configured in a resource set with repetition=ON, it denotes the gNB beams for CSI-RS in those symbols are the same (e.g., beams 1616). Thus, the UE can use different receiving beams to receive different symbols. If repetition=OFF, the gNB beams can be different (e.g., beams 1618). Referring to FIG. 16, the CSI-RS resource set 1 1606 is based on resources with indexes 1602 and 1604, and the CSI-RS resource set 2 1612 is based on resources with indexes 1608 and 1610. The resource sets are mapped to corresponding symbols 1614.

In this regard, the beam management framework of FIG. 16 can support symbol-level beam measurement, which can be associated with a large overhead, especially when the number of beams is large. Then how to reduce the overhead for downlink beam management can be one issue addressed by disclosed techniques.

In some aspects, the beam indication is based on a SSB/CSI-RS resource by a Transmission Configuration Indicator (TCI). For PDSCH, the DCI based beam indication can be used when the scheduling offset is above or equal to a threshold UE reported. When scheduling offset is below a threshold, PDSCH beam should be based on a PDCCH beam in a Control Resource Set (CORESET).

Figure 17:
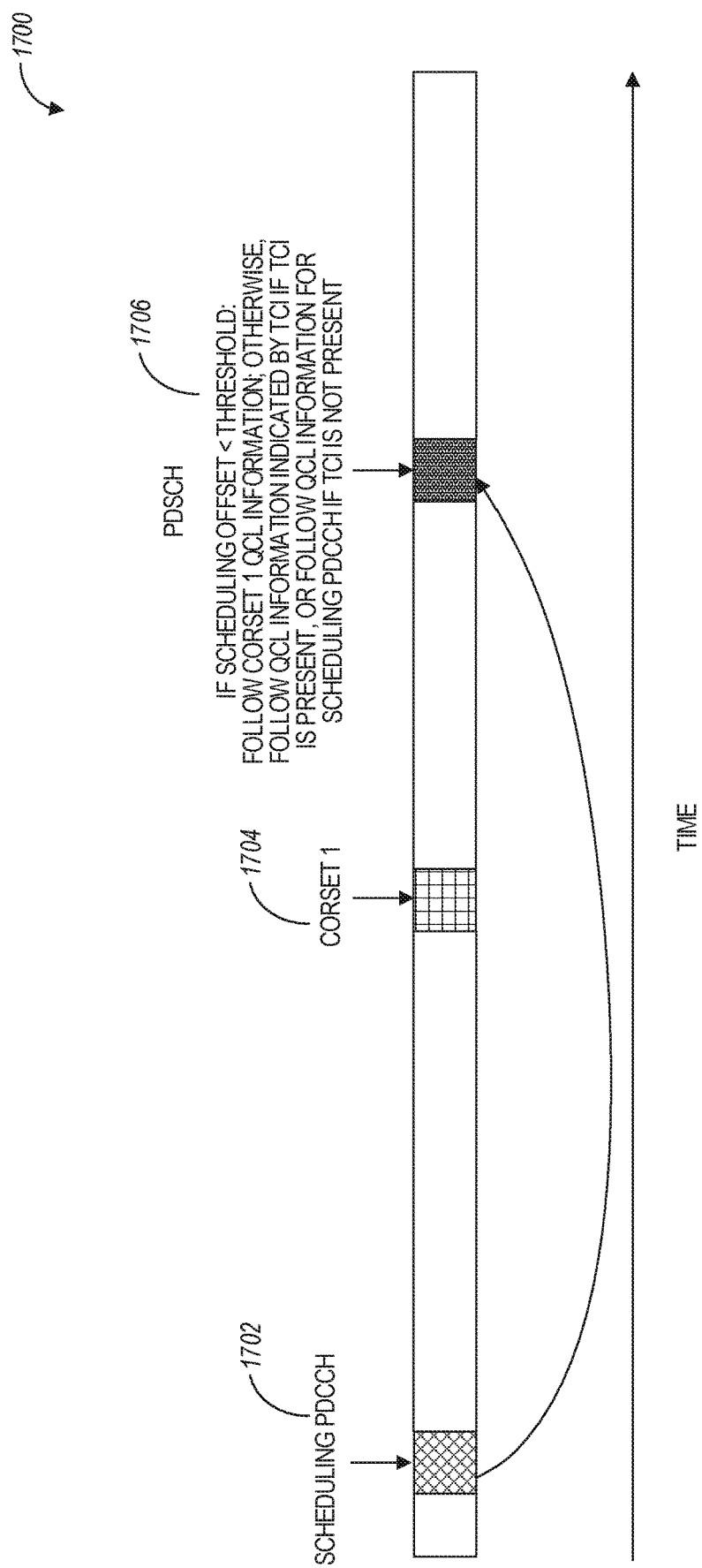
FIG. 17 illustrates an example beam indication framework, in accordance with some aspects.

FIG. 17 illustrates an example beam indication framework 1700, in accordance with some aspects. In some aspects, the UE may report its capability that it can only support 1 active PDSCH beam. Referring to FIG. 17, a scheduling PDCCH is communicated at operation 1702 scheduling PDSCH 1706, and a CORESET 1 is communicated at operation 1704. In aspects when the scheduling offset is smaller than a threshold, CORSET 1 QCL information is followed; otherwise, QCL information indicated by TCI is followed, if TCI is present, or QCL information for scheduling PDCCH is followed if TCI is not present. In some aspects, according to the procedure in FIG. 17, although only 1 active TCI state is configured, UE has to maintain multiple candidate PDSCH beams: one is based on the active TCI state and the others are based on the PDCCH beam.

In some aspects, disclosed techniques include enabling the downlink beam management with low overhead and latency, as well as a single beam operation based downlink beam management, including beam measurement and selection with overhead and latency reduction and single beam operation support.

As used herein, the term "gNB beam" indicates a gNB spatial domain transmission filter, and the term "UE beam" indicates a UE spatial domain receiving filter, and "the same beam between two downlink signals" indicates the antenna ports for the downlink signals are quasi-co-located (QCLed).

Low Overhead/Latency Based Beam Management

Figure 18:
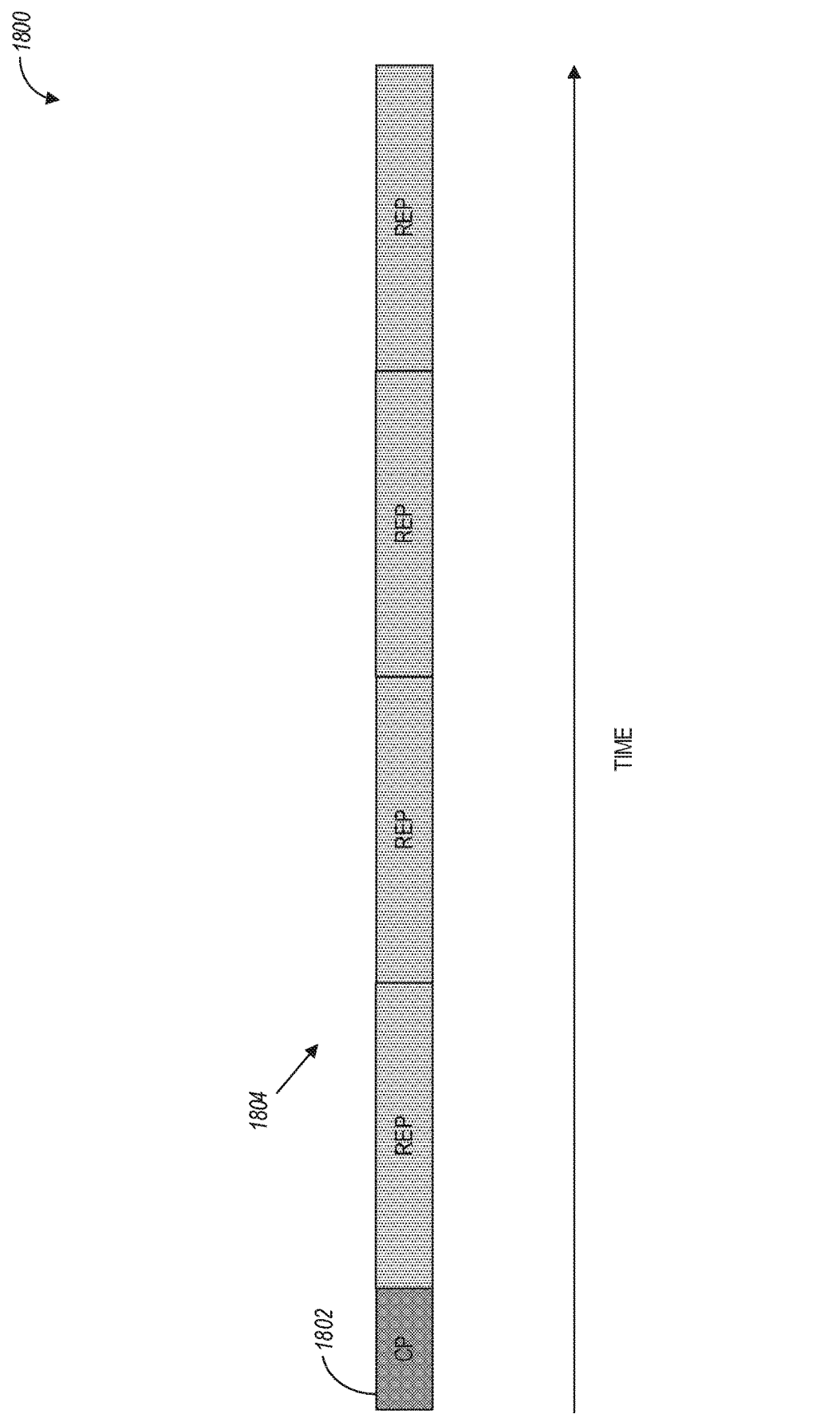
FIG. 18 illustrates a time domain signal structure for IFDMA based CSI-RS, in accordance with some aspects.

In some aspects, the CSI-RS could have 1 port with a configurable density, e.g. 1 Resource Element (RE) per Resource Block (RB) or 3 RE/RB. The CSI-RS is mapped in a uniformly distributed manner, which is based on Interleaved Frequency Division Multiplexing Access (IFDMA) structure. FIG. 18 illustrates a time domain signal structure for IFDMA based CSI-RS when its frequency domain density is 3 REs/RB, where the signal can be repeatedly transmitted 4 times (at 1804) after a cyclic prefix (CP) transmission (at 1802), in accordance with some aspects. In some aspects, the gNB or the UE can apply different beams in different repetitions.

Figure 19:
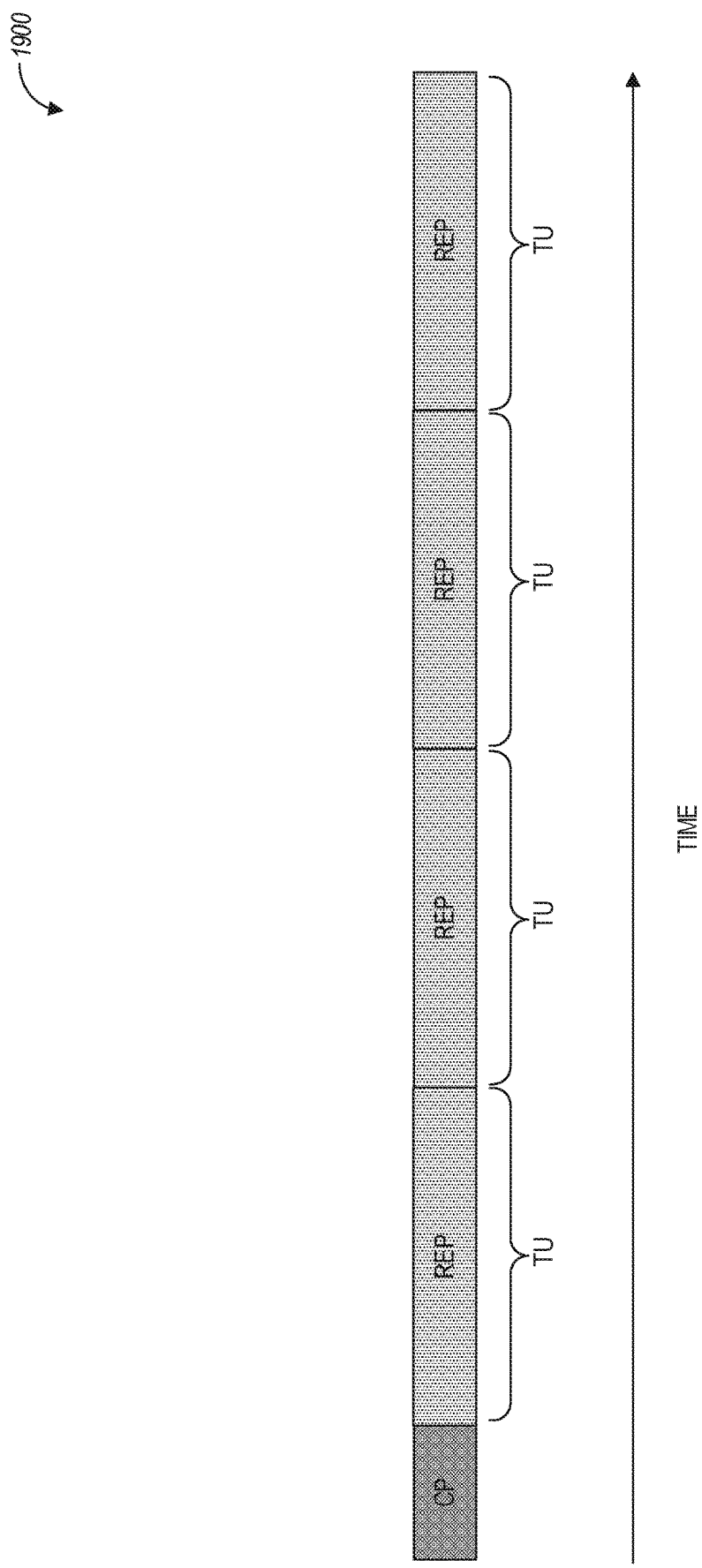
FIG. 19 illustrates a time unit partition in a first option, in accordance with some aspects.
Figure 20:
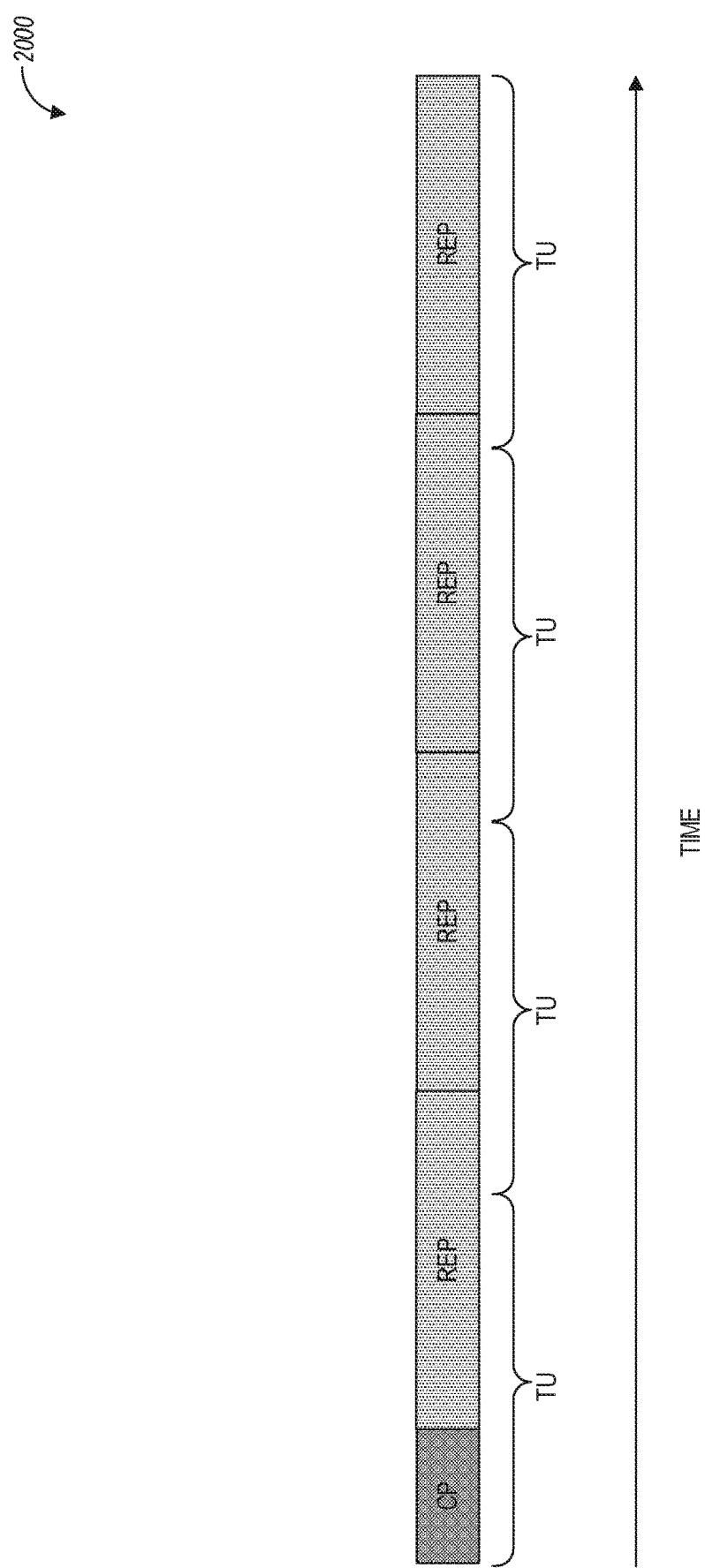
FIG. 20 illustrates a time unit partition in a second option, in accordance with some aspects.

In some aspects, up to N beams can be applied to a CSI-RS symbol with the frequency density equals to D, where N=12/D and each beam can be applied to a time unit of one or multiple repetition or a time unit which equals to T/N and T indicates the duration for the CSI-RS symbol. The duration of the time unit can be configured by higher layer signaling and/or be determined by the frequency density of CSI-RS and/or the subcarrier offset of the CSI-RS. FIG. 19 and FIG. 20 illustrate different options for time unit (TU) partition.

FIG. 19 illustrates a time unit partition 1900 in a first option, in accordance with some aspects. FIG. 20 illustrates a time unit partition 2000 in a second option, in accordance with some aspects.

In some aspects, the maximum number of TUs (N_max) could be equal to the frequency domain densities.

In some aspects, for a CSI-RS resource, its time unit(s) can be configured by RRC signaling or DCI. In some aspects, the time unit(s) can be configured by a bit-map with the length of N_max, where each bit is associated with corresponding TU—value 0 may indicate the TU is not allocated and value 1 may indicate the TU is allocated to the CSI-RS resource. A UE may expect a CSI-RS resource should be located in consecutive TU(s).

In some aspects, the TU index(es) can be jointly coded. For example, when the frequency domain density for a CSI-RS is 3 REs/RB, the candidate TU index(es) could be {TU0, TU1, TU2, TU3, TU0 and TU1, TU2 and TU3, TU0 and TU1 and TU2 and TU3}.

If the time unit(s) is not configured, the whole symbol should be used by the CSI-RS resource.

In some aspects, for UE beam refinement, the gNB may inform the UE whether one CSI-RS resource could be divided into multiple TUs. In some aspects, the UE can use different receiving beams to receive different TUs to support fast beam refinement and measurement. Whether one CSI-RS resource could be dived into multiple TUs can be configured by RRC signaling or DCI or a combination thereof. Alternatively, it could be determined based on the frequency domain density and/or the subcarrier offset. For example, only when subcarrier offset is 0, the UE can consider the CSI-RS could be divided into multiple TUs.

In some aspects, the UE may report whether it support fast beam sweeping operation or report the minimal time domain granularity of for a CSI-RS resource, e.g. {¼ symbol, ⅓ symbol ½ symbol, 1 symbol} per subcarrier spacing or across all subcarrier spacing as a UE capability, which is reported via RRC signaling.

Single beam operation support.

In some aspects, for a UE supporting only 1 active TCI state, the gNB may configure 1 TCI state by RRC or active 1 TCI state by MAC Control Element (CE) if multiple TCI states are configured by RRC. In that case, the UE does not need to use different beams to receive the downlink signal with different scheduling offsets as shown in FIG. 17.

Figure 21:
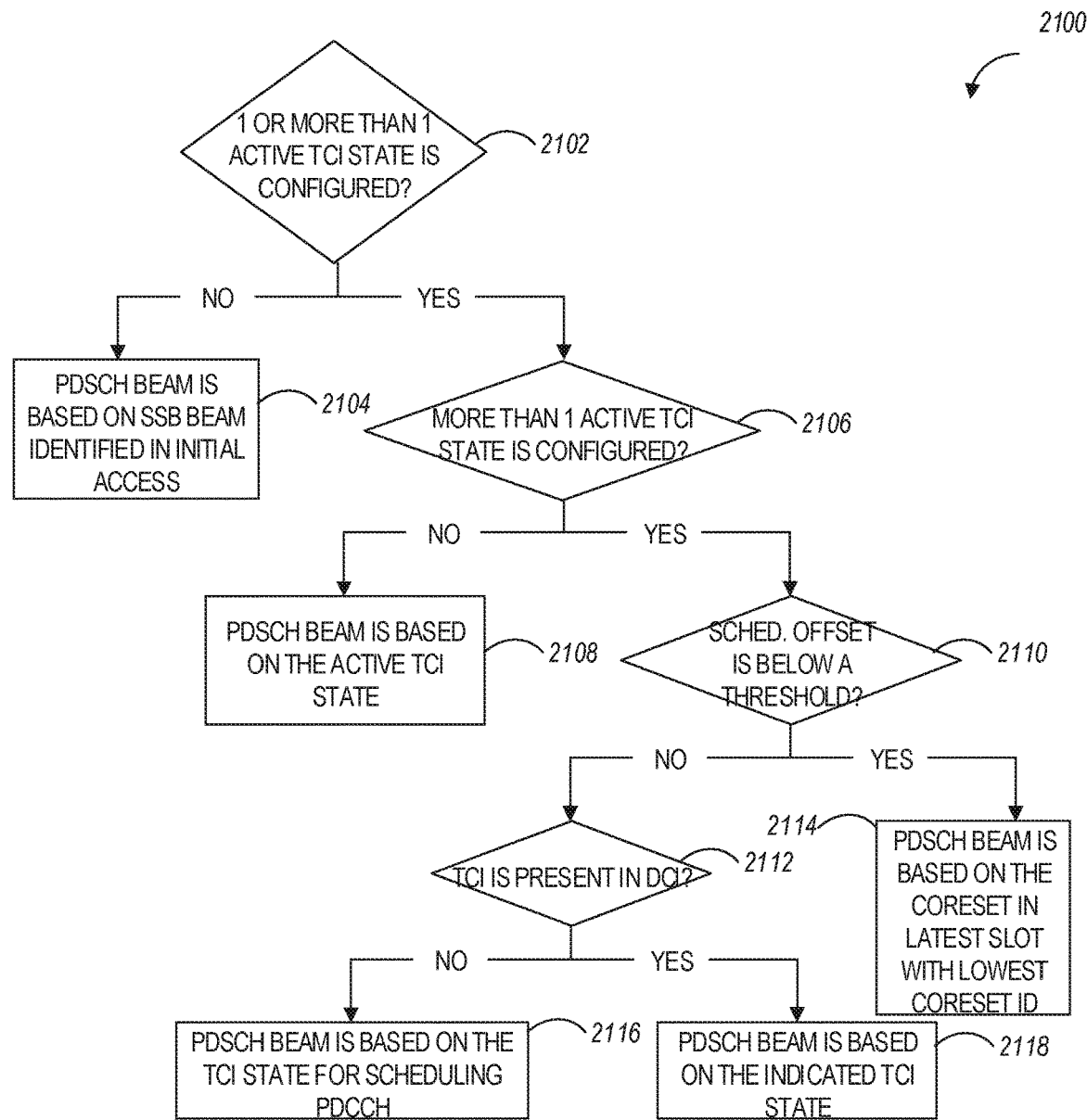
FIG. 21 illustrates a flowchart of an example method for PDSCH beam indication, in accordance with some aspects.

In some aspects, if a UE is configured with 1 TCI state for PDSCH by MAC CE or RRC, it can follow this configured TCI state to receive PDSCH regardless of scheduling offset and/or whether TCI state is present in the scheduling DCI. If a UE is configured with more than 1 TCI state for PDSCH by MAC CE, it could determine the PDSCH beam based on the scheduling offset and whether the TCI is present in DCI. FIG. 21 illustrates a flowchart of an example method 2100 for PDSCH beam indication, in accordance with some aspects. Referring to FIG. 21, the method 2100 may start at operation 2102, when it is determined whether one, or more than one, active TCI state is configured. If no TCI states are configured, at operation 2104, the PDSCH beam is based on an SSB beam identified in an initial access. If one, or more than one, active TCI state is configured, at operation 2106, when it is determined whether more than one active TCI state is configured. If not more than one TCI state is configured, at operation 2108, the PDSCH beam is based on the active TCI state. If more than one active TCI state is configured, at operation 2110, it is determined whether the scheduling offset is below a threshold. If it is determined that the offset is below a threshold, at operation 2114, the PDSCH beam is based on the CORESET in the latest slot with the lowest CORESET ID. If the scheduling offset is not below the threshold, at operation 2112, it is determined whether TCI is present in DCI. If the TCI is present in the DCI, at operation 2118, the PDSCH beam is based on the indicated TCI state. If the TCI is not present in the DCI, at operation 2116, the PDSCH beam is based on the TCI state for scheduling PDCCH.

Figure 22:
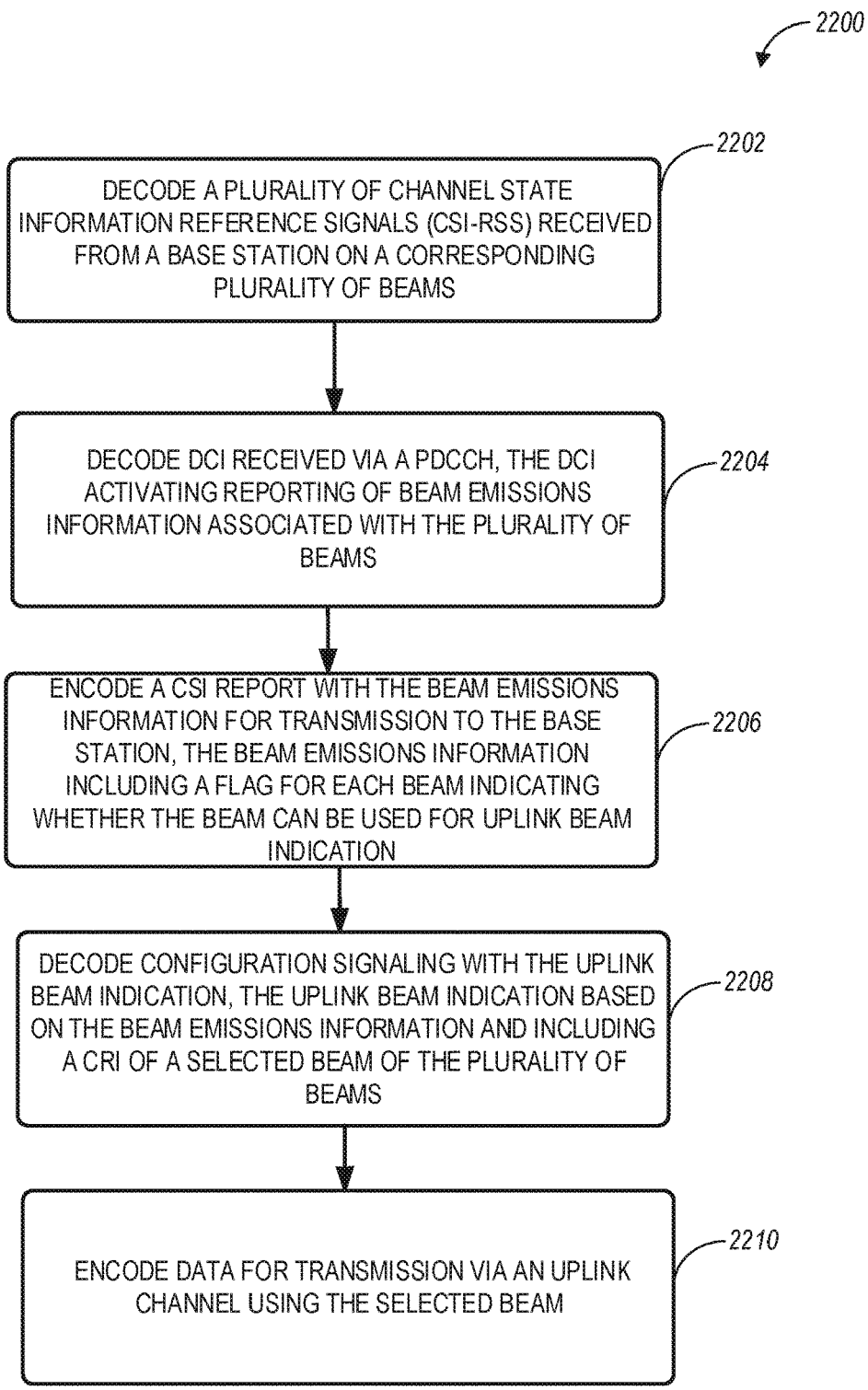
FIG. 22 illustrates a flowchart of an example method for emission and panel aware beam selection, in accordance with some aspects.

FIG. 22 illustrates a flowchart of an example method 2200 for emission and panel aware beam selection, in accordance with some aspects. Referring to FIG. 22, at operation 2202, a plurality of channel state information reference signals (CSI-RSs) received from a base station on a corresponding plurality of beams are decoded (e.g., by UE 101). At operation 2204, downlink control information (DCI) received via a physical downlink control channel (PDCCH) is downloaded. The DCI activating reporting of beam emissions information associated with the plurality of beams. At operation 2206, a channel state information (CSI) report is encoded with the beam emissions information for transmission to the base station. The beam emissions information includes a flag for each beam of the plurality of beams indicating whether the beam can be used for uplink beam indication. At operation 2208, configuration signaling with the uplink beam indication is decoded by the UE. The uplink beam indication is based on the beam emissions information and includes a channel resource index (CRI) of a selected beam of the plurality of beams. At operation 2210, data is encoded for transmission via an uplink channel using the selected beam.

In some aspects, a UE includes circuitry to measure the quality of a gNB or a UE beam based on a Channel State Information Reference Signal (CSI-RS) with a configurable time domain granularity. In some aspects, a symbol of CSI-RS can be divided into N_max time units (TUs). In some aspects, N_max can be configured by higher layer signaling and/or DCI and/or determined by the frequency domain density and/or starting subcarrier offset of CSI-RS. In some aspects, up to N_max beams can be applied to a CSI-RS symbol. In some aspects, a TU can be determined by the symbol duration of a CSI-RS and number of TUs. In some aspects, the first TU may start from the beginning of a CSI-RS symbol including cyclic prefix (CP). In some aspects, the first TU may start from the beginning of a CSI-RS symbol after cyclic prefix (CP). In some aspects, the allocated TU(s) for a CSI-RS resource can be configured by RRC signaling and/or DCI. In some aspects, the time unit(s) can be configured by a bit-map with the length of N_max, where each bit is associated with corresponding TU: value 0 may indicate the TU is not allocated and value 1 may indicate the TU is allocated to the CSI-RS resource. In some aspects, a UE may expect a CSI-RS resource should be located in consecutive TU(s). In some aspects, the TU index(es) can be jointly coded. In some aspects, if the time unit(s) is not configured, the whole symbol should be used by the CSI-RS resource. In some aspects, for UE beam refinement, the gNB may inform the UE whether one CSI-RS resource could be divided into multiple TUs. In some aspects, whether one CSI-RS resource could be dived into multiple TUs can be configured by RRC signaling or DCI or a combination thereof. In some aspects, whether one CSI-RS resource could be dived into multiple TUs could be determined based on the frequency domain density and/or the subcarrier offset. In some aspects, the UE may report whether it support fast beam sweeping operation or report the minimal time domain granularity of for a CSI-RS resource per subcarrier spacing or across all subcarrier spacing as a UE capability. In some aspects, the UE includes the circuitry to support single-beam operation. In some aspects, if a UE is configured with 1 TCI state for PDSCH by MAC CE or RRC, it should follow this configured TCI state to receive PDSCH regardless of scheduling offset and/or whether TCI state is present in the scheduling DCI. In some aspects, if a UE is configured with more than 1 TCI state for PDSCH by MAC CE, it could determine the PDSCH beam based on the scheduling offset and whether the TCI is present in DCI.

Figure 23:
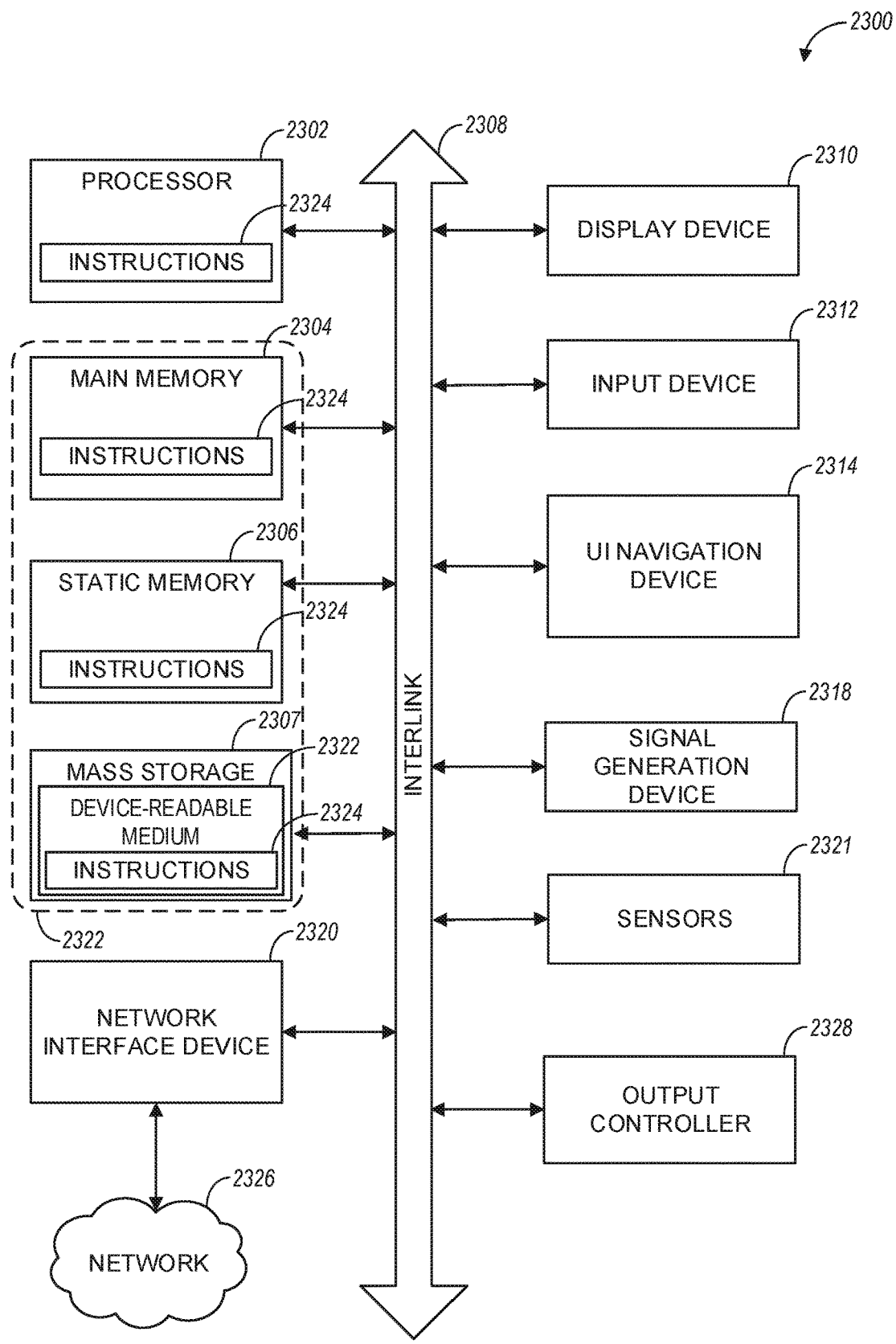
FIG. 23 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 23 illustrates a block diagram of a communication device such as an evolved Node-B (eNB), a next generation Node-B (gNB), an access point (AP), a wireless station (STA), a mobile station (MS), or a user equipment (UE), in accordance with some aspects. In alternative aspects, the communication device 2300 may operate as a standalone device or may be connected (e.g., networked) to other communication devices.

Circuitry (e.g., processing circuitry) is a collection of circuits implemented in tangible entities of the device 2300 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 2300 follow.

In some aspects, the device 2300 may operate as a standalone device or may be connected (e.g., networked) to other devices. In a networked deployment, the communication device 2300 may operate in the capacity of a server communication device, a client communication device, or both in server-client network environments. In an example, the communication device 2300 may act as a peer communication device in peer-to-peer (P2P) (or other distributed) network environment. The communication device 2300 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 2300 may include a hardware processor 2302 (e.g., a central processing unit (CPU), a graphics processing unit (GPU), a hardware processor core, or any combination thereof), a main memory 2304, a static memory 2306, and mass storage 2307 (e.g., hard drive, tape drive, flash storage, or other block or storage devices), some or all of which may communicate with each other via an interlink (e.g., bus) 2308.

The communication device 2300 may further include a display device 2310, an alphanumeric input device 2312 (e.g., a keyboard), and a user interface (UI) navigation device 2314 (e.g., a mouse). In an example, the display device 2310, input device 2312 and UI navigation device 2314 may be a touch screen display. The communication device 2300 may additionally include a signal generation device 2318 (e.g., a speaker), a network interface device 2320, and one or more sensors 2321, such as a global positioning system (GPS) sensor, compass, accelerometer, or other sensors. The communication device 2300 may include an output controller 2328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2307 may include a communication device-readable medium 2322, on which is stored one or more sets of data structures or instructions 2324 (e.g., software) embodying or utilized by any one or more of the techniques or functions described herein. In some aspects, registers of the processor 2302, the main memory 2304, the static memory 2306, and/or the mass storage 2307 may be, or include (completely or at least partially), the device-readable medium 2322, on which is stored the one or more sets of data structures or instructions 2324, embodying or utilized by any one or more of the techniques or functions described herein. In an example, one or any combination of the hardware processor 2302, the main memory 2304, the static memory 2306, or the mass storage 2316 may constitute the device-readable medium 2322.

As used herein, the term "device-readable medium" is interchangeable with "computer-readable medium" or "machine-readable medium". While the communication device-readable medium 2322 is illustrated as a single medium, the term "communication device-readable medium" may include a single medium or multiple media (e.g., a centralized or distributed database, and/or associated caches and servers) configured to store the one or more instructions 2324.

The term "communication device-readable medium" may include any medium that is capable of storing, encoding, or carrying instructions (e.g., instructions 2324) for execution by the communication device 2300 and that causes the communication device 2300 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 2324 may further be transmitted or received over a communications network 2326 using a transmission medium via the network interface device 2320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMITS) family of standards, peer-to-peer (P2P) networks, among others. In an example, the network interface device 2320 may include one or more physical jacks (e.g., Ethernet, coaxial, or phone jacks) or one or more antennas to connect to the communications network 2326. In an example, the network interface device 2320 may include a plurality of antennas to wirelessly communicate using at least one of single-input multiple-output (SIMO), MIO, or multiple-input single-output (MISO) techniques. In some examples, the network interface device 2320 may wirelessly communicate using Multiple User MIMO techniques.

The term "transmission medium" shall be taken to include any intangible medium that is capable of storing, encoding or carrying instructions for execution by the communication device 2300, and includes digital or analog communications signals or another intangible medium to facilitate communication of such software. In this regard, a transmission medium in the context of this disclosure is a device-readable medium.

ADDITIONAL NOTES AND EXAMPLES

Example 1 is an apparatus of a user equipment (UE), the apparatus comprising: processing circuitry, wherein to configure the UE for New Radio (NR) communications, the processing circuitry is to: decode a plurality of channel state information reference signals (CSI-RSs) received from a base station on a corresponding plurality of beams; decode downlink control information (DCI) received via a physical downlink control channel (PDCCH), the DCI activating reporting of beam emissions information associated with the plurality of beams; encode a channel state information (CSI) report with the beam emissions information for transmission to the base station, the beam emissions information comprising a flag for each beam of the plurality of beams indicating whether the beam can be used for uplink beam indication; decode configuration signaling with the uplink beam indication, the uplink beam indication based on the beam emissions information and including a channel resource index (CRI) of a selected beam of the plurality of beams; and encode data for transmission via an uplink channel using the selected beam; and memory coupled to the processing circuitry, the memory configured to store the beam emissions information.

In Example 2, the subject matter of Example 1 includes, wherein the CSI report includes: a CRI for each beam of the plurality of beams; beam quality information for each beam of the plurality of beams; and the flag for each beam of the plurality of beams, wherein the flag is based on whether the beam is associated with harmful emissions.

In Example 3, the subject matter of Examples 1-2 includes, wherein the processing circuitry is to: encode the CSI report with the beam emissions information for transmission to the base station, the beam emissions information comprising a maximum power reduction (MPR) level for each beam of the plurality of beams, indicating maximum uplink transmission power can be reduced when a corresponding beam is indicated by the configuration signaling.

In Example 4, the subject matter of Examples 1-3 includes, wherein the processing circuitry is to: encode the CSI report with antenna panel information for each beam of the plurality of beams, the antenna panel information for a corresponding beam of the plurality of beams indicating an antenna panel index of a UE antenna panel used for uplink transmissions when the corresponding beam is selected for the uplink beam indication.

In Example 5, the subject matter of Examples 1-4 includes, wherein the processing circuitry is to: encode the CSI report with antenna ports group information for each beam of the plurality of beams, the antenna ports group information for a corresponding beam of the plurality of beams indicating at least one antenna port used for uplink transmissions when the corresponding beam is selected for the uplink beam indication.

In Example 6, the subject matter of Example 5 includes, wherein the configuration signaling is one of sounding reference signal (SRS) configuration signaling, physical uplink control channel (PUCCH) configuration signaling, and physical random access channel (PRACH) configuration signaling.

In Example 7, the subject matter of Examples 1-6 includes, wherein the configuration signaling includes an antenna ports group information for each beam of the plurality of beams, the antenna ports group information indicating at least one antenna port used for uplink transmissions when a corresponding beam of the plurality of beams is selected for the uplink beam indication.

In Example 8, the subject matter of Examples 1-7 includes, wherein the processing circuitry is to: detect a beam of the plurality of beams is not emission-safe when used for transmitting uplink data; and encode a beam recovery request for transmission to the base station, the beam recovery request to initiate a beam recovery procedure based on the detected beam.

In Example 9, the subject matter of Examples 1-8 includes, wherein the processing circuitry is to: decode a plurality of synchronization signal blocks (SSBs) received from the base station via the corresponding plurality of beams; encode the CSI report with the beam emissions information for transmission to the base station, the beam emissions information comprising a flag for each of the plurality of beams used to receive the plurality of SSBs indicating whether the beam can be used for uplink beam indication; and decode the configuration signaling with the uplink beam indication, the uplink beam indication based on the beam emissions information and including an SSB resource index (SSBRI) of the selected beam of the plurality of beams.

In Example 10, the subject matter of Examples 1-9 includes, transceiver circuitry coupled to the processing circuitry; and, one or more antennas coupled to the transceiver circuitry.

Example 11 is a non-transitory computer-readable storage medium that stores instructions for execution by one or more processors of a base station operating in a 5G network, the instructions to configure the one or more processors for New Radio (NR) communications and to cause the base station to: encode a plurality of channel state information reference signals (CSI-RSs) for transmission to a user equipment (UE) on a corresponding plurality of beams; encode downlink control information (DCI) for transmission via a physical downlink control channel (PDCCH), the DCI activating reporting of beam emissions information associated with the plurality of beams; decode a channel state information (CSI) report with the beam emissions information, the beam emissions information comprising a flag for each beam of the plurality of beams indicating whether the beam can be used for uplink beam indication; encode configuration signaling with the uplink beam indication, the uplink beam indication based on the beam emissions information and including a channel resource index (CRI) of a selected beam of the plurality of beams; and decode uplink data received via an uplink channel using the selected beam.

In Example 12, the subject matter of Example 11 includes, wherein the instructions further configure the one or more processors to cause the base station to: encode a plurality of synchronization signal blocks (SSBs) for transmission to the UE using the corresponding plurality of beams; decode the CSI report with the beam emissions information, the beam emissions information comprising a flag for each of the plurality of beams used to receive the plurality of SSBs indicating whether the beam can be used for uplink beam indication; and encode the configuration signaling with the uplink beam indication, the uplink beam indication based on the beam emissions information and including an SSB resource index (SSBRI) of the selected beam of the plurality of beams.

In Example 13, the subject matter of Example 12 includes, wherein the CSI report includes: a CRI for each beam of the plurality of beams; beam quality information for each beam of the plurality of beams; and the flag for each beam of the plurality of beams, wherein the flag is based on whether the beam is associated with harmful emissions.

In Example 14, the subject matter of Examples 11-13 includes, wherein the instructions further configure the one or more processors to cause the base station to: decode the CSI report with antenna ports group information for each beam of the plurality of beams, the antenna ports group information for a corresponding beam of the plurality of beams indicating at least one antenna port used for uplink transmissions when the corresponding beam is selected for the uplink beam indication.

In Example 15, the subject matter of Example 14 includes, wherein the configuration signaling is one of sounding reference signal (SRS) configuration signaling, physical uplink control channel (PUCCH) configuration signaling, and physical random access channel (PRACH) configuration signaling.

Example 16 is a non-transitory computer-readable storage medium that stores instructions for execution by one or more processors of a user equipment (UE), the instructions to configure the one or more processors for New Radio (NR) communications and to cause the UE to: decode a plurality of channel state information reference signals (CSI-RSs) received from a base station on a corresponding plurality of beams; decode downlink control information (DCI) received via a physical downlink control channel (PDCCH), the DCI activating reporting of beam emissions information associated with the plurality of beams; encode a channel state information (CSI) report with the beam emissions information for transmission to the base station, the beam emissions information comprising a flag for each beam of the plurality of beams indicating whether the beam can be used for uplink beam indication; decode configuration signaling with the uplink beam indication, the uplink beam indication based on the beam emissions information and including a channel resource index (CRI) of a selected beam of the plurality of beams; and encode data for transmission via an uplink channel using the selected beam.

In Example 17, the subject matter of Example 16 includes, wherein the instructions further configure the one or more processors to cause the UE to: encode the CSI report with the beam emissions information for transmission to the base station, the beam emissions information comprising a maximum power reduction (MPR) level for each beam of the plurality of beams, indicating maximum uplink transmission power can be reduced when a corresponding beam is indicated by the configuration signaling.

In Example 18, the subject matter of Examples 16-17 includes, wherein the instructions further configure the one or more processors to cause the UE to: encode the CSI report with antenna panel information for each beam of the plurality of beams, the antenna panel information for a corresponding beam of the plurality of beams indicating an antenna panel index of a UE antenna panel used for uplink transmissions when the corresponding beam is selected for the uplink beam indication.

In Example 19, the subject matter of Examples 16-18 includes, wherein the instructions further configure the one or more processors to cause the UE to: encode the CSI report with antenna ports group information for each beam of the plurality of beams, the antenna ports group information for a corresponding beam of the plurality of beams indicating at least one antenna port used for uplink transmissions when the corresponding beam is selected for the uplink beam indication.

In Example 20, the subject matter of Examples 16-19 includes, wherein the CSI report includes: a CRI for each beam of the plurality of beams; beam quality information for each beam of the plurality of beams; and the flag for each beam of the plurality of beams, wherein the flag is based on whether the beam is associated with harmful emissions.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus of a user equipment (UE), the apparatus comprising:
   processing circuitry, wherein to configure the UE for New Radio (NR) communications, the processing circuitry is to:
      decode a plurality of channel state information reference signals (CSI-RSs) received from a base station on a corresponding plurality of beams;
      decode downlink control information (DCI) received via a physical downlink control channel (PDCCH), the DCI activating reporting of beam emissions information associated with the plurality of beams;
      encode a channel state information (CSI) report with the beam emissions information for transmission to the base station, the beam emissions information comprising a flag for each beam of the plurality of beams indicating whether the beam can be used for uplink beam indication;
      decode configuration signaling with the uplink beam indication, the uplink beam indication based on the beam emissions information and including a channel resource index (CRI) of a selected beam of the plurality of beams; and
      encode data for transmission via an uplink channel using the selected beam; and
   memory coupled to the processing circuitry, the memory configured to store the beam emissions information.

2. The apparatus of claim 1, wherein the CSI report includes:
   a CRI for each beam of the plurality of beams;
   beam quality information for each beam of the plurality of beams; and
   the flag for each beam of the plurality of beams, wherein the flag is based on whether the beam is associated with harmful emissions.

3. The apparatus of claim 1, wherein the processing circuitry is to:
   encode the CSI report with the beam emissions information for transmission to the base station, the beam emissions information comprising a maximum power reduction (MPR) level for each beam of the plurality of beams, indicating maximum uplink transmission power can be reduced when a corresponding beam is indicated by the configuration signaling.

4. The apparatus of claim 1, wherein the processing circuitry is to:
   encode the CSI report with antenna panel information for each beam of the plurality of beams, the antenna panel information for a corresponding beam of the plurality of beams indicating an antenna panel index of a UE antenna panel used for uplink transmissions when the corresponding beam is selected for the uplink beam indication.

5. The apparatus of claim 1, wherein the processing circuitry is to:
   encode the CSI report with antenna ports group information for each beam of the plurality of beams, the antenna ports group information for a corresponding beam of the plurality of beams indicating at least one antenna port used for uplink transmissions when the corresponding beam is selected for the uplink beam indication.

6. The apparatus of claim 5, wherein the configuration signaling is one of sounding reference signal (SRS) configuration signaling, physical uplink control channel (PUCCH) configuration signaling, and physical random access channel (PRACH) configuration signaling.

7. The apparatus of claim 1, wherein the configuration signaling includes an antenna ports group information for each beam of the plurality of beams, the antenna ports group information indicating at least one antenna port used for uplink transmissions when a corresponding beam of the plurality of beams is selected for the uplink beam indication.

8. The apparatus of claim 1, wherein the processing circuitry is to:
   detect a beam of the plurality of beams is not emission-safe when used for transmitting uplink data; and
   encode a beam recovery request for transmission to the base station, the beam recovery request to initiate a beam recovery procedure based on the detected beam.

9. The apparatus of claim 1, wherein the processing circuitry is to:
   decode a plurality of synchronization signal blocks (SSBs) received from the base station via the corresponding plurality of beams;
   encode the CSI report with the beam emissions information for transmission to the base station, the beam emissions information comprising a flag for each of the plurality of beams used to receive the plurality of SSBs indicating whether the beam can be used for uplink beam indication; and
   decode the configuration signaling with the uplink beam indication, the uplink beam indication based on the beam emissions information and including an SSB resource index (SSBRI) of the selected beam of the plurality of beams.

10. The apparatus of claim 1, further comprising transceiver circuitry coupled to the processing circuitry; and, one or more antennas coupled to the transceiver circuitry.

11. A non-transitory computer-readable storage medium that stores instructions for execution by one or more processors of a base station operating in a 5G network, the instructions to configure the one or more processors for New Radio (NR) communications and to cause the base station to:
- encode a plurality of channel state information reference signals (CSI-RSs) for transmission to a user equipment (UE) on a corresponding plurality of beams;
- encode downlink control information (DCI) for transmission via a physical downlink control channel (PDCCH), the DCI activating reporting of beam emissions information associated with the plurality of beams;
- decode a channel state information (CSI) report with the beam emissions information, the beam emissions information comprising a flag for each beam of the plurality of beams indicating whether the beam can be used for uplink beam indication;
- encode configuration signaling with the uplink beam indication, the uplink beam indication based on the beam emissions information and including a channel resource index (CRI) of a selected beam of the plurality of beams; and
- decode uplink data received via an uplink channel using the selected beam.

12. The non-transitory computer-readable storage medium of claim 11, wherein the instructions further configure the one or more processors to cause the base station to:
- encode a plurality of synchronization signal blocks (SSBs) for transmission to the UE using the corresponding plurality of beams;
- decode the CSI report with the beam emissions information, the beam emissions information comprising a flag for each of the plurality of beams used to receive the plurality of SSBs indicating whether the beam can be used for uplink beam indication; and
- encode the configuration signaling with the uplink beam indication, the uplink beam indication based on the beam emissions information and including an SSB resource index (SSBRI) of the selected beam of the plurality of beams.

13. The non-transitory computer-readable storage medium of claim 12, wherein the CSI report includes:
- a CRI for each beam of the plurality of beams;
- beam quality information for each beam of the plurality of beams; and
- the flag for each beam of the plurality of beams, wherein the flag is based on whether the beam is associated with harmful emissions.

14. The non-transitory computer-readable storage medium of claim 11, wherein the instructions further configure the one or more processors to cause the base station to:
- decode the CSI report with antenna ports group information for each beam of the plurality of beams, the antenna ports group information for a corresponding beam of the plurality of beams indicating at least one antenna port used for uplink transmissions when the corresponding beam is selected for the uplink beam indication.

15. The non-transitory computer-readable storage medium of claim 14, wherein the configuration signaling is one of sounding reference signal (SRS) configuration signaling, physical uplink control channel (PUCCH) configuration signaling, and physical random access channel (PRACH) configuration signaling.

16. A non-transitory computer-readable storage medium that stores instructions for execution by one or more processors of a user equipment (UE), the instructions to configure the one or more processors for New Radio (NR) communications and to cause the UE to:
- decode a plurality of channel state information reference signals (CSI-RSs) received from a base station on a corresponding plurality of beams;
- decode downlink control information (DCI) received via a physical downlink control channel (PDCCH), the DCI activating reporting of beam emissions information associated with the plurality of beams;
- encode a channel state information (CSI) report with the beam emissions information for transmission to the base station, the beam emissions information comprising a flag for each beam of the plurality of beams indicating whether the beam can be used for uplink beam indication;
- decode configuration signaling with the uplink beam indication, the uplink beam indication based on the beam emissions information and including a channel resource index (CRI) of a selected beam of the plurality of beams; and
- encode data for transmission via an uplink channel using the selected beam.

17. The non-transitory computer-readable storage medium of claim 16, wherein the instructions further configure the one or more processors to cause the UE to:
- encode the CSI report with the beam emissions information for transmission to the base station, the beam emissions information comprising a maximum power reduction (MPR) level for each beam of the plurality of beams, indicating maximum uplink transmission power can be reduced when a corresponding beam is indicated by the configuration signaling.

18. The non-transitory computer-readable storage medium of claim 16, wherein the instructions further configure the one or more processors to cause the UE to:
- encode the CSI report with antenna panel information for each beam of the plurality of beams, the antenna panel information for a corresponding beam of the plurality of beams indicating an antenna panel index of a UE antenna panel used for uplink transmissions when the corresponding beam is selected for the uplink beam indication.

19. The non-transitory computer-readable storage medium of claim 16, wherein the instructions further configure the one or more processors to cause the UE to:
- encode the CSI report with antenna ports group information for each beam of the plurality of beams, the antenna ports group information for a corresponding beam of the plurality of beams indicating at least one antenna port used for uplink transmissions when the corresponding beam is selected for the uplink beam indication.

20. The non-transitory computer-readable storage medium of claim 16, wherein the CSI report includes:
- a CRI for each beam of the plurality of beams;
- beam quality information for each beam of the plurality of beams; and
- the flag for each beam of the plurality of beams, wherein the flag is based on whether the beam is associated with harmful emissions.

* * * * *